United States Patent
Kinugawa et al.

(10) Patent No.: US 9,528,410 B2
(45) Date of Patent: Dec. 27, 2016

(54) REDUCING AGENT SUPPLYING DEVICE

(71) Applicant: DENSO CORPORATION, Kariya, Aichi-pref. (JP)

(72) Inventors: Masumi Kinugawa, Okazaki (JP); Shigeto Yahata, Toyoake (JP); Yuuki Tarusawa, Kariya (JP); Keiji Noda, Kuwana (JP); Mao Hosoda, Kariya (JP)

(73) Assignee: DENSO CORPORATION, Kariya (JP)

(*) Notice: Subject to any disclaimer, the term of this patent is extended or adjusted under 35 U.S.C. 154(b) by 87 days.

(21) Appl. No.: 14/608,694

(22) Filed: Jan. 29, 2015

(65) Prior Publication Data
US 2015/0211400 A1 Jul. 30, 2015

(30) Foreign Application Priority Data

Jan. 30, 2014 (JP) ................. 2014-015933

(51) Int. Cl.
*F01N 3/08* (2006.01)
*F01N 3/20* (2006.01)

(52) U.S. Cl.
CPC ............ F01N 3/0892 (2013.01); F01N 3/208 (2013.01); *F01N 2240/30* (2013.01); *F01N 2240/38* (2013.01); *F01N 2610/03* (2013.01); *F01N 2610/105* (2013.01); *F01N 2900/1602* (2013.01); *F01N 2900/1811* (2013.01); *Y02T 10/24* (2013.01)

(58) Field of Classification Search
None
See application file for complete search history.

(56) References Cited

U.S. PATENT DOCUMENTS

| 2010/0236223 | A1 | 9/2010 | Ovrebo et al. |
| 2010/0242898 | A1 | 9/2010 | Ovrebo et al. |
| 2011/0023453 | A1 | 2/2011 | Lucka et al. |
| 2015/0101315 | A1 | 4/2015 | Ovrebo et al. |

FOREIGN PATENT DOCUMENTS

| JP | 2000-054833 | * | 2/2000 |
| JP | 2007-100578 | | 4/2007 |
| JP | 2009-162173 | | 7/2009 |
| JP | 2009-264320 | | 11/2009 |
| JP | 4803186 | | 8/2011 |

OTHER PUBLICATIONS

Office Action (3 pages) dated Mar. 1, 2016, issued in corresponding Japanese Application No. 2014-015933 and English translation (4 pages).

* cited by examiner

*Primary Examiner* — Kishor Mayekar
(74) *Attorney, Agent, or Firm* — Nixon & Vanderhye PC

(57) ABSTRACT

A reducing agent supplying device includes a reaction container. The reaction container has a reaction chamber therein in which fuel of a hydrocarbon compound is mixed with air and is oxidized with oxygen in air. An equivalent ratio of fuel to air inside the reaction chamber is adjusted to be within a specified equivalent ratio range. A temperature inside the reaction chamber is adjusted to be within a specified temperature range. The specified equivalent ratio range and the specified temperature range are set such that a cool flame reaction, through which fuel inside the reaction chamber is partially oxidized with oxygen in air, is generated. The fuel partially oxidized through the cool flame reaction is used as the reducing agent.

6 Claims, 14 Drawing Sheets

REDUCING AGENT SUPPLYING DEVICE

CROSS REFERENCE TO RELATED APPLICATION

This application is based on and incorporates herein by reference Japanese Patent Application No. 2014-15933 filed on Jan. 30, 2014.

TECHNICAL FIELD

The present disclosure relates to a reducing agent supplying device for supplying a hydrocarbon compound (fuel) as a reducing agent used for NOx reduction.

BACKGROUND

Generally, NOx (Nitrogen Oxides) contained in exhaust gas of an internal combustion engine is purified in reaction of the NOx with a reducing agent in the presence of a reducing catalyst. For example, a Patent Literature (JP 2009-162173 A) discloses a purifying system that uses fuel (hydrocarbon compound) for combustion of an internal combustion engine as a reducing agent, and the system supplies the fuel into an exhaust passage at a position upstream of a reducing catalyst. In the purifying system, when a temperature of the reducing catalyst does not reach an activation temperature, fuel supply is stopped until the temperature of the reducing catalyst reaches the activation temperature.

SUMMARY

According to the study by the inventors of the present disclosure, however, when a temperature of the reducing catalyst reaches the activation temperature but does not reach a certain high temperature, NOx reducing action (reducing performance) by fuel is still low, an adequate NOx purification rate cannot be obtained.

It is an objective of the present disclosure to provide a reducing agent supplying device having an improved NOx purification rate.

In an aspect of the present disclosure, a reducing agent supplying device is for a fuel combustion system that includes a NOx purifying device with a reducing catalyst arranged in an exhaust passage to purify NOx contained in exhaust gas of an internal combustion engine. The reducing agent supplying device supplies a reducing agent into the exhaust passage at a position upstream of the reducing catalyst.

The reducing agent supplying device includes a reaction container, an equivalent ratio controller, and a temperature controller. The reaction container has a reaction chamber therein in which fuel of a hydrocarbon compound is mixed with air and is oxidized with oxygen in air. The equivalent ratio controller adjusts an equivalent ratio of fuel to air inside the reaction chamber to be within a specified equivalent ratio range. The temperature controller adjusts a temperature inside the reaction chamber to be within a specified temperature range. The specified equivalent ratio range and the specified temperature range are set such that a cool flame reaction, through which fuel inside the reaction chamber is partially oxidized with oxygen in air, is generated. The fuel that is partially oxidized through the cool flame reaction is used as the reducing agent.

It should be noted that fuel under a high temperature environment burns by self-ignition through oxidation reaction with oxygen contained in air, even in the atmospheric pressure. Such oxidation reaction by the self-ignition combustion is also called "hot flame reaction" in which carbon dioxide and water are generated while generating heat. However, when a ratio of the fuel and the air (i.e., equivalent ratio), and the ambient temperature fall within given ranges, a period for which the oxidation reaction stays in a cool flame reaction as described below becomes longer, and thereafter the hot flame reaction occurs. That is, the oxidation reaction occurs in two steps, the cool flame reaction and the hot flame reaction.

The cool flame reaction is likely to occur when the ambient temperature is low, and the equivalent ratio is low. In the cool flame reaction, fuel is partially oxidized with oxygen contained in the ambient air. When the ambient temperature rises due to heat generation caused by the cool flame reaction, and thereafter a given time elapses, the fuel partially oxidized (for example, aldehyde) is further oxidized, whereby the hot flame reaction occurs. When the partially oxidized fuel, such as aldehyde, generated through the cool flame reaction is used as an NOx purifying reducing agent, an NOx purification rate is improved as compared with a case in which fuel not partially oxidized is used.

In view of the above, the inventors of the present disclosure have studied usage of a reformed fuel as a reducing agent for NOx purification to improve the NOx purification rate. The reformed fuel is generated by reforming fuel into, for example, aldehyde through the cool flame reaction. As a result, the inventors have obtained knowledge that the cool flame reaction can occur before the hot flame reaction by adjusting an ambient temperature and the equivalent ratio to be within given ranges respectively.

In view of the knowledge, the reducing agent supplying device includes the reaction container having the reaction chamber, and fuel is oxidized with oxygen in air inside the reaction chamber. A temperature inside the reaction chamber and the equivalent ratio are adjusted so as to generate the cool flame reaction, whereby fuel is partially oxidized through the cool flame reaction. Then, the partially oxidized fuel is used as a reducing agent for NOx purification. Therefore, the NOx purification rate can be improved compared to a case in which fuel without being partially oxidized is used as a reducing agent.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
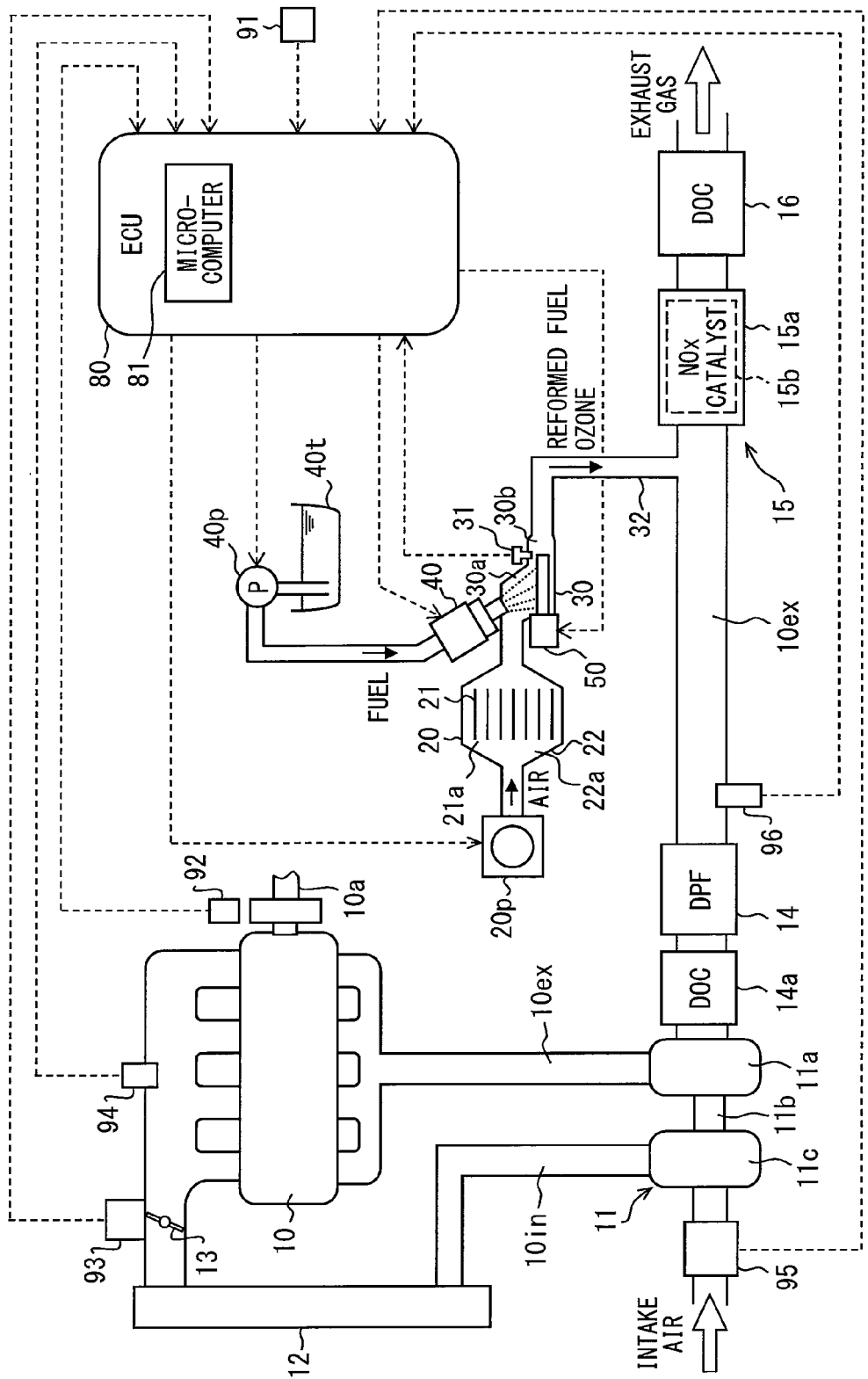
FIG. 1 is a schematic view of a reducing agent supplying device applied to a combustion system.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A combustion system as illustrated in FIG. 1 includes an internal combustion engine 10, a supercharger 11, a diesel particular filter (DPF) 14, a DPF regeneration device (regenerating DOC 14a), a NOx purifying device 15, a reducing agent purifying device (purifying DOC 16) and an reducing agent supplying device. The combustion system is mounted on a vehicle and the vehicle is powered by an output from the internal combustion engine 10. In the present embodiment, the internal combustion engine 10 is a compression self-ignition diesel engine using diesel fuel (light oil) for combustion.

The supercharger 11 includes a turbine 11a, a rotating shaft 11b and a compressor 11c. The turbine 11a is disposed in an exhaust passage 10ex for the internal combustion engine 10 and rotates by kinetic energy of exhaust gas. The rotating shaft 11b connects an impeller of the turbine 11a to an impeller of the compressor 11c and transmits a rotating force of the turbine 11a to the compressor 11c. The compressor 11c is disposed in an intake passage 10in of the internal combustion engine 10 and supplies intake air to the internal combustion engine 10 after compressing (i.e., supercharging) the intake air.

A cooler 12 is disposed in the intake passage 10in downstream of the compressor 11c. The cooler 12 cools intake air compressed by the compressor 11c, and the compressed intake air cooled by the cooler 12 is distributed into plural combustion chambers of the internal combustion engine 10 through an intake manifold after a flow amount of the compressed intake air is adjusted by a throttle valve 13.

The regenerating DOC 14a (Diesel Oxidation Catalyst), the DPF 14 (Diesel Particulate Filter), the NOx purifying device 15, and the purifying DOC 16 are disposed in this order in the exhaust passage 10ex downstream of the turbine 11a. The DPF 14 collects particulates contained in exhaust gas. The regenerating DOC 14a includes a catalyst that oxidizes unburned fuel contained in the exhaust gas and that burns the unburned fuel. By burning the unburned fuel, the particulates collected by the DPF 14 are burned and the DPF 14 is regenerated, whereby the collecting capacity of the DPF 14 is maintained. It should be noted that this burning by the unburned fuel inside the regenerating DOC 14a is not constantly executed but is temporarily executed when the regeneration of the DPF 14 is required.

A supply passage 32 of the reducing agent supplying device is connected to the exhaust passage 10ex downstream of the DPF 14 and upstream of the NOx purifying device 15. A reformed fuel generated by the reducing agent supplying device is supplied as a reducing agent into the exhaust passage 10ex through the supply passage 32. The reformed fuel is generated by partially oxidizing hydrocarbon (i.e., fuel), which is used as a reducing agent, into partially oxidized hydrocarbon, such as aldehyde, as will be described later with reference to FIG. 7.

The NOx purifying device 15 includes a honeycomb carrier 15b for carrying a reducing catalyst and a housing 15a housing the carrier 15b therein. The NOx purifying device 15 purifies NOx contained in exhaust gas through a reaction of NOx with the reformed fuel in the presence of the reducing catalyst, i.e., a reduction process of NOx into $N_2$. It should be noted that, although $O_2$ is also contained in the exhaust gas in addition to NOx, the reformed reducing agent selectively (preferentially) reacts with NOx in the presence of $O_2$.

In the present embodiment, the reducing catalyst has absorptivity to adsorb NOx. More specifically, the reducing catalyst demonstrates the absorptivity to adsorb NOx in the exhaust gas when a catalyst temperature is lower than an activation temperature at which reducing reaction by the reducing catalyst can occur. Whereas, when the catalyst temperature is higher than the activation temperature, NOx adsorbed by the reducing catalyst is reduced by the reformed fuel and then is released from the reducing catalyst. For example, the NOx purifying device 15 may provide NOx adsorption performance with a silver/alumina catalyst that is carried by the carrier 15b.

The purifying DOC 16 has a housing that houses a carrier carrying an oxidation catalyst. The purifying DOC 16 oxidizes the reducing agent, which flows out from the NOx purifying device 15 without being used for NOx reduction, in the presence of the oxidation catalyst. Thus, the reducing agent can be prohibited from releasing into an atmosphere through an outlet of the exhaust passage 10ex. It should be noted that an activation temperature of the oxidation catalyst (e.g., 200° C.) is lower than the activation temperature (e.g., 250° C.) of the reducing catalyst.

Next, the reducing agent supplying device will be described below. Generally, the reducing agent supplying device generates the reformed fuel and supplies the reformed fuel into the exhaust passage 10ex through the supply passage 32. The reducing agent supplying device includes a discharging reactor 20 (ozone generator), an air pump 20p, a reaction container 30, a fuel injector 40 and a heater 50.

Figure 2:
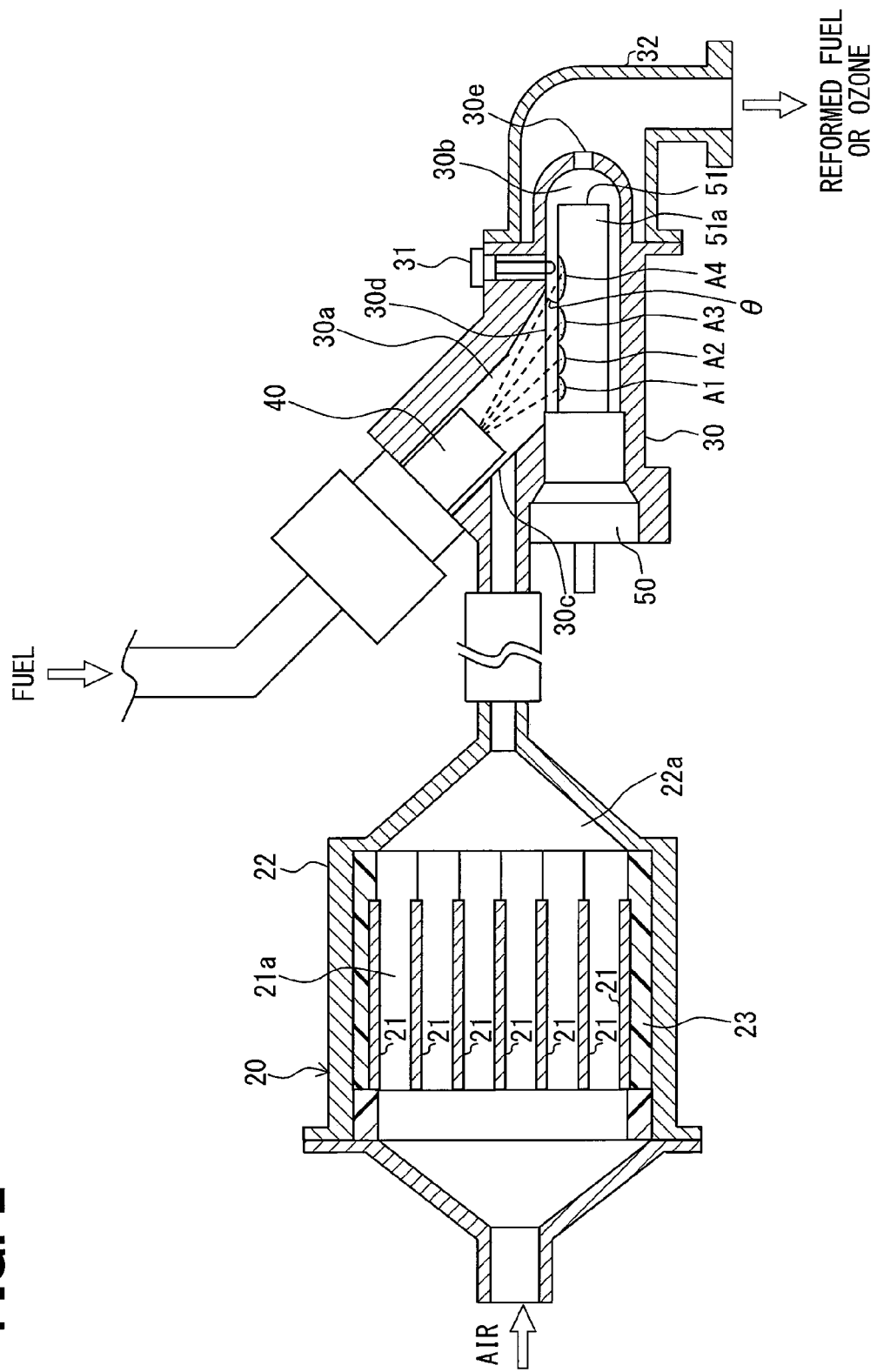
FIG. 2 is a cross-sectional view of the reducing agent supplying device.

As shown in FIG. 2, the discharging reactor 20 includes a housing 22 having a fluid passage 22a therein and a plurality of pairs of electrodes 21 are arranged inside the fluid passage 22a. More specifically, the electrodes 21 are held within the housing 22 through electric insulating members 23. The electrodes 21 have a plate shape and are arranged to face each other in parallel. One electrode 21, which is grounded, and the other electrode 21, which is applied with high voltage when electric power is supplied to the discharging reactor 20, are alternately arranged. Power application to the electrodes 21 is controlled by a microcomputer 81 of an electric control unit (ECU 80).

Air that is blown by the air pump 20p flows into the housing 22 of the discharging reactor 20. The air pump 20p is driven by an electric motor, and the electric motor is controlled by the microcomputer 81. The air blown by the air pump 20p flows into the fluid passage 22a within the housing 22, and flows through the discharging passages 21a formed between the electrodes 21.

The reaction container 30 is attached to a downstream side of the discharging reactor 20, and a fuel injection chamber 30a and a vaporizing chamber 30b are formed inside the reaction container 30. The fuel injection chamber 30a and the vaporizing chamber 30b may correspond to "reaction chamber" in which fuel is oxidized with oxygen inside air. An air inlet 30c is formed in the reaction container 30 and air that passed through the discharging passages 21a flows into the reaction container 30 through the air inlet 30c. The air inlet 30c is in communication with the fuel injection chamber 30a, and the fuel injection chamber 30a is in communication with the vaporizing chamber 30b through an opening 30d. Air that passed through the discharging passages 21a and flowed from the air inlet 30c flows through the fuel injection chamber 30a and the vaporizing chamber 30b in this order and thereafter spouts from an injection port 30e formed in the reaction container 30. The injection port 30e is in communication with the supply passage 32.

The fuel injector 40 is attached to the reaction container 30. Fuel in liquid form (liquid fuel) within a fuel tank 40t is supplied to the fuel injector 40 by a pump 40p, and injected into the fuel injection chamber 30a through injection holes D1, D2, D3 and D4 (refer to FIG. 3) of the fuel injector 40. The fuel within the fuel tank 40t is also used for combustion as described above, and thus the fuel is commonly used for combustion of the internal combustion engine 10 and used as the reducing agent. The fuel injector 40 has an injection valve and the valve is actuated by an electromagnetic force by an electromagnetic solenoid. The microcomputer 81 controls electric power supply (i.e., energization) to the electromagnetic solenoid.

The heater 50 is attached to the reaction container 30, and the heater 50 has a heating element (not shown) that generates heat when electric power is supplied to the heating element. Further, the heater 50 includes a heat transfer cover 51 that houses the heating element therein. The electric power supply (energization) to the heating element is controlled by the microcomputer 81. An outer circumferential surface of the heat transfer cover 51 may serve as a heating surface 51a and a temperature of the heating surface 51a is increased by heating the heat transfer cover 51 by the heating element. The heat transfer cover 51 has a cylindrical shape with a bottom and extends in a horizontal direction. More specifically, the heat transfer cover 51 extends in the horizontal direction in a state in which the reducing agent supplying device is mounted to a vehicle. That is, a center line Ch of the heat transfer cover 51 (refer to FIG. 4) extends in the horizontal direction.

The heating surface 51a is disposed inside the vaporizing chamber 30b and heats liquid fuel injected from the fuel injector 40. The liquid fuel heated by the heater 50 is vaporized inside the vaporizing chamber 30b. The vaporized fuel is further heated to a temperature equal to or higher than a predetermined certain temperature. As a result, fuel is thermally decomposed into hydrocarbon that has a small carbon number, i.e., cracking occurs.

Figure 3:
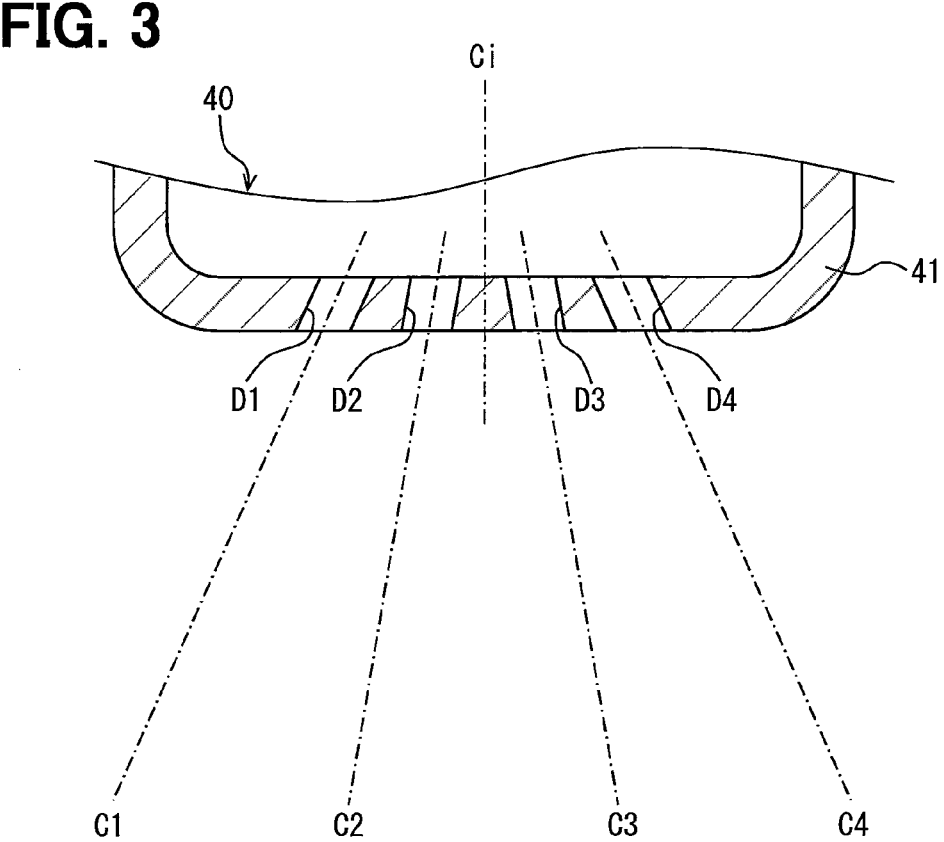
FIG. 3 is a cross-sectional view of a fuel injector illustrating a cross-sectional shape of injection holes.

The fuel injector 40 includes an injection hole plate 41 and the injection holes D1, D2, D3 and D4 are formed on the injection hole plate 41 (refer to FIG. 3). The injection holes D1, D2, D3 and D4 are arranged in a longitudinal direction of the heat transfer cover 51 (i.e., along the center line Ch). A center line Ci of the fuel injector 40 is angled relative to a vertical direction in a state in which the reducing agent supplying device is mounted to a vehicle. In other words, the center line Ch of the heater 50 is angled relative to the center line Ci of the fuel injector 40.

As shown in FIG. 3, the injection holes D1, D2, D3 and D4 have a shape linearly extend, i.e., the injection holes D1, D2, D3 and D4 have an axis that linearly extends. A cross section of each injection hole D1, D2, D3, D4 is a circle shape and the injection hole D1, D2, D3, D4 has a constant cross-sectional area. Each center line C1, C2, C3, C4 of the injection hole D1, D2, D3, D4 is angled relative to the center line Ci of the fuel injector 40. Fuel in liquid form (liquid fuel) is sprayed (atomized) through each injection hole D1, D2, D3, D4 and the splayed liquid fuel spreads in a substantially cone shape. In other words, a spray trajectory of the sprayed liquid fuel has a substantially cone shape spreading in a direction away from each injection hole D1, D2, D3, D4. In the present embodiment, a center line of the spray trajectory of the sprayed liquid fuel substantially corresponds to the center line C1, C2, C3, C4 of each injection hole D1, D2, D3, D4.

The sprayed liquid fuel from the injection holes D1 to D4 enters into the vaporizing chamber 30b through the opening 30d and is sprayed against the heating surface 51a. A crossing angle θ (refer to FIG. 2) formed between each center line C1, C2, C3, C4 and the heating surface 51a is an acute angle less than 90°. More specifically, the crossing angle θ is defined as an angle between the center line C1, C2, C3, C4 and a virtual horizontal surface of the heating surface 34a that virtually contacts an uppermost portion of the heating surface 51a.1 The injection hole D1 positioned at the uppermost stream side of the injector 40 (i.e., the leftmost side in FIG. 2) provides the crossing angle θ having a maximum value, and the crossing angles θ respectively corresponding to the injection holes D2, D3, D4 decreases in this order toward a tip end of the heater 50 (i.e., a right direction in FIG. 2). The injection holes D1 to D4 are positioned above the heating surface 51a with respect to gravity.

Figure 4:
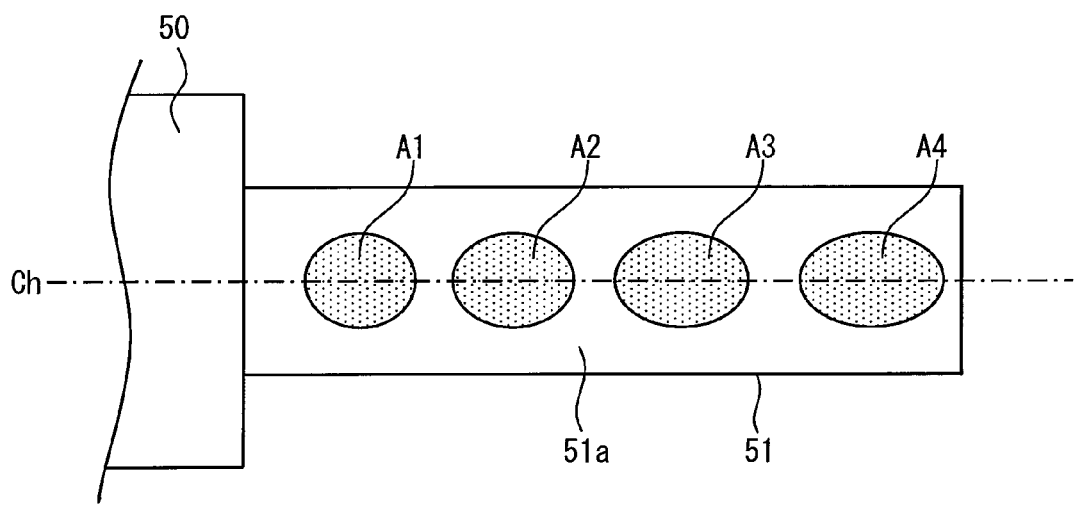
FIG. 4 is a schematic view of a projected area of a fuel spray on a heater heating surface.

Since the crossing angle θ is an acute angle, the sprayed liquid fuel diagonally reaches the heating surface 51a. Therefore, as shown in FIG. 4, a sprayed region A1, A2, A3, A4 of the heating surface 51a, onto which the liquid fuel from each injection hole D1, D2, D3, D4 is sprayed, has an elliptical shape with a longer axis along the center line Ch. The longer axis of the sprayed region A1 corresponding to the crossing angle θ having a minimum value is the shortest axis, and the longer axis of the sprayed region A2, A3, A4 increases in this order along the center line Ch. In other words, the longer axis of the sprayed region A1, A2, A3, A4 increases as the crossing angle θ decreases. It should be noted that, when increasing a diameter of the injection hole D1, D2, D3, D4, or increasing a distance between the injection hole D1, D2, D3, D4 and the heating surface 51a, an area of the sprayed region A1, A2, A3, A4 may also increase beyond an area of the heating surface 34a. In view of this, the diameter of the injection hole D1, D2, D3, D4 and the distance between the injection hole D1, D2, D3, D4 and the heating surface 51a are set such that the sprayed region A1, A2, A3, A4 is within the heating surface 51a.

A temperature sensor 31 that detects a temperature inside the vaporizing chamber 30b is attached to the reaction container 30. Specifically, the temperature sensor 31 is arranged above the heat generating surface of the heater 50 within the vaporizing chamber 30b. Further, the temperature sensor 31 is positioned in a downstream side of the vaporizing chamber 30b with respect to the sprayed fuel in an air flow direction such that the fuel is not directly sprayed onto the temperature sensor 31. A temperature detected by the temperature sensor 31 is a temperature of the vaporized fuel after reacting with air. The temperature sensor 31 outputs information of the detected temperature to the ECU 80.

When the electric power is supplied to the discharging reactor 20, electrons emitted from the electrodes 21 collide with oxygen molecules contained in air in the discharging passages 21a. As a result, ozone is generated from the oxygen molecules. That is, the discharging reactor 20 brings the oxygen molecules into a plasma state through a discharging process, and generates ozone as active oxygen. Then, the ozone generated by the discharging reactor 20 is contained in air that flows into the reaction container 30 through the air inlet 30c.

A cool flame reaction occurs inside the vaporizing chamber 30b. In the cool flam reaction, fuel in gas form is partially oxidized with oxygen or ozone within air. The fuel partially oxidized is called "reformed fuel", and partial oxide (for example, aldehyde) may be one of examples of the reformed fuel in which a portion of the fuel (hydrocarbon compound) is oxidized with an aldehyde group (CHO).

Next, the cool flame reaction will be described in detail with reference to FIGS. 5 to 7.

Figure 5:
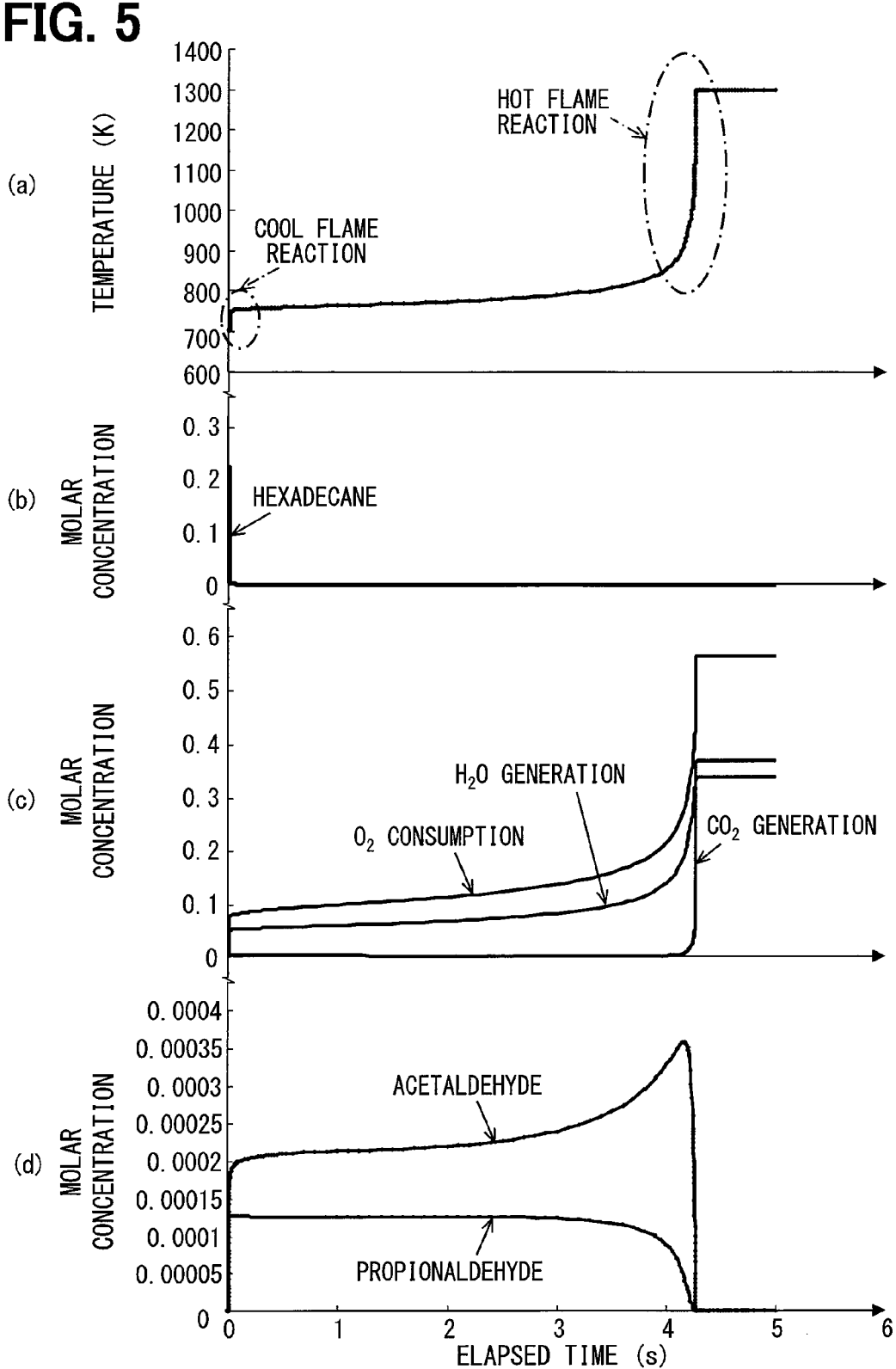
FIG. 5 is graphs related to a two-step oxidation reaction of a cool flame reaction and a hot flame reaction.
Figure 6:
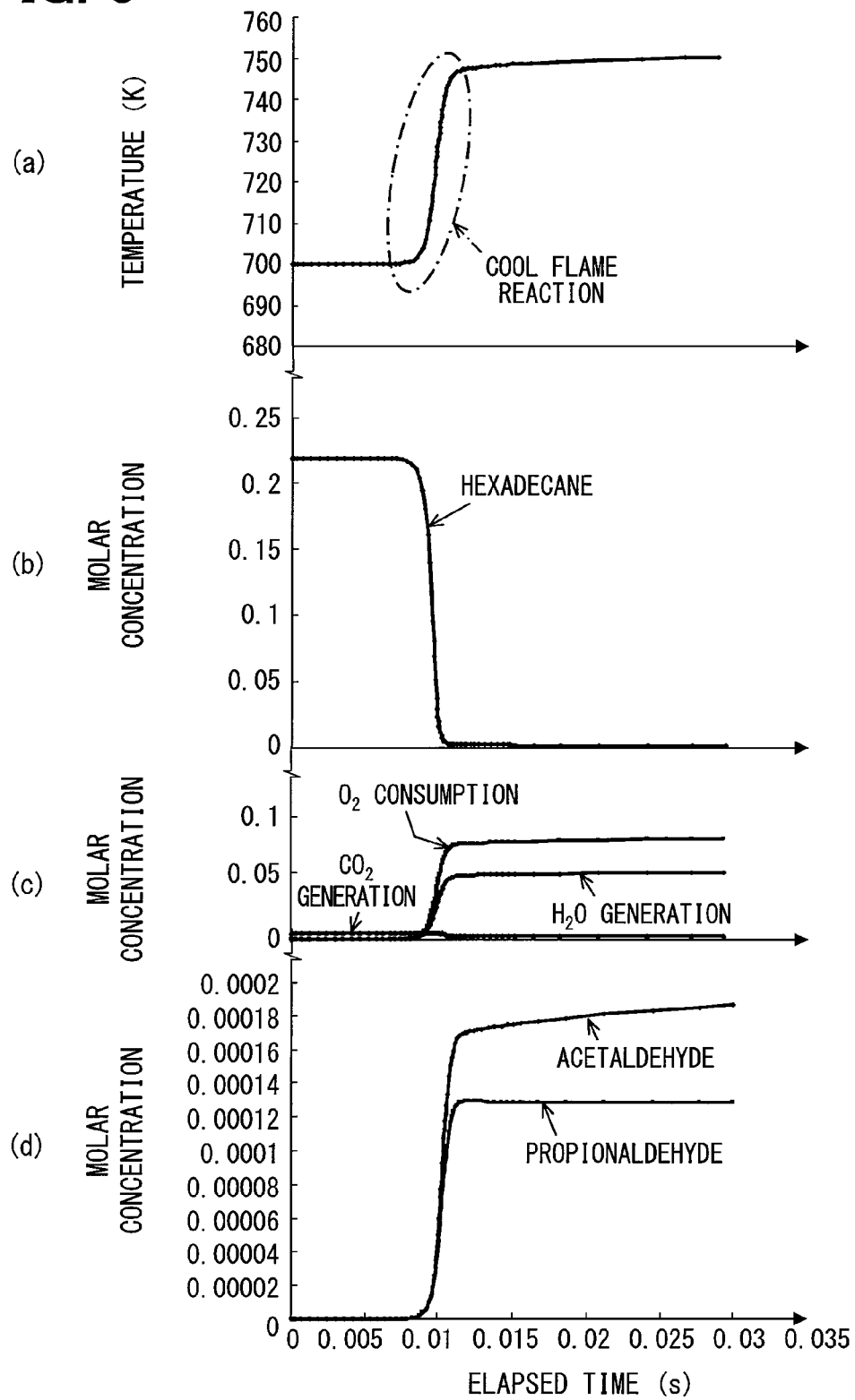
FIG. 6 is graphs illustrating portions of FIG. 5 corresponding to the cool flame reaction.

FIGS. 5 and 6 illustrate simulation results showing a change in a variety of physical quantities with respect to an elapsed time from a spray start in case where fuel (hexadecane) is sprayed onto the heater 50 having a temperature of 430° C. In FIGS. 5 and 6, a graph (a) illustrates a change in an ambient temperature, a graph (b) illustrates a change in a molar concentration of the fuel (hexadecane) sprayed toward the heater 50, a graph (c) illustrates a change in a molar concentration of (i) oxygen consumed through the oxidation process, (ii) water molecules generated through the oxidation process and (iii) carbon dioxide molecules generated through the oxidation process, and a graph (d) illustrates a change in a molar concentration of acetaldehyde and propionaldehyde that are generated through the cool flame reaction. Initial conditions at the start of the fuel injection are set as 1 atmospheric pressure, 2200 ppm hexadecane concentration, 20% oxygen concentration, 9% carbon dioxide concentration and 2% water concentration.

As shown in FIGS. 5 and 6, the ambient temperature increases, the molar concentration of the fuel decreases, and the molar concentration of the reformed fuel increased, immediately after injecting the fuel. This means that fuel generates heat by being oxidized with oxygen and that the reformed fuel is generated from the fuel, i.e., the cool flame reaction occurs. However, such a temperature increase and changes in molar concentration are temporary, and the temperature increase and the changes in the molar concentration do not appear until about 4 seconds elapse from the start of the fuel injection.

As shown in FIG. 5, when about 4 seconds elapse, the ambient temperature increases, the molar concentration of the reformed fuel decreases, generation amounts of carbon dioxide and water increase, and a consumption amount of oxygen increases. This means that the reformed fuel generates heat by being oxidized with oxygen and that the reformed fuel completely burns to generate carbon dioxide and water, i.e., the hot flame reaction occurs. A temperature increase amount through the cool flame reaction is less than that through the hot flame reaction. Further, an oxygen consumption amount through the cool flame reaction is less than that through the hot flame reaction.

As shown in FIG. 5, when the oxidation reaction occurs through two steps, the reformed fuel is generated as a reaction intermediate during a period from the cool flame reaction to the hot flame reaction. Examples of the reaction intermediate may be a variety of hydrocarbon compounds, such as aldehyde, ketone, or the like. FIG. 7 illustrates an example of a main reaction path through which aldehyde is generated.

Figure 7:
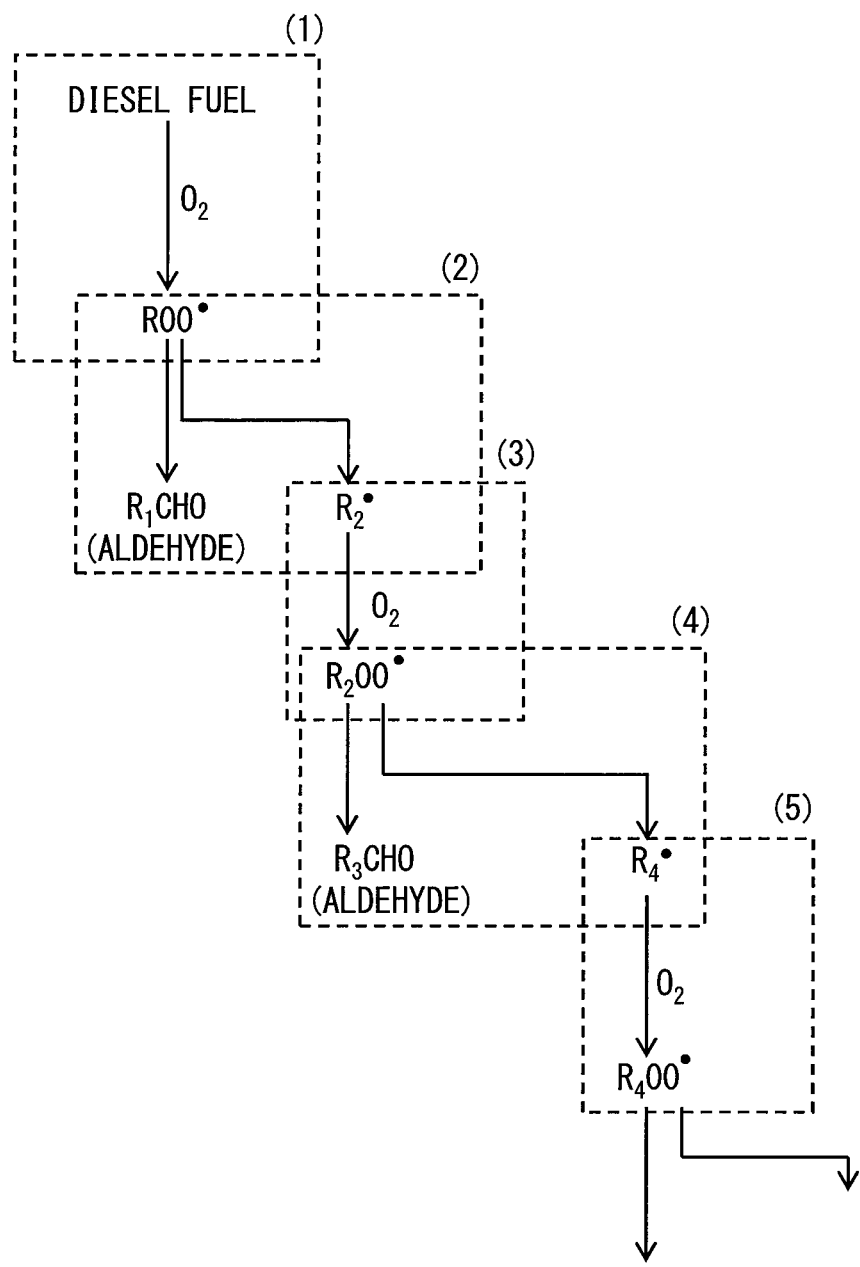
FIG. 7 is a diagram illustrating reaction process of the cool flame reaction.

As indicated by (1) in FIG. 7, hydrocarbon (diesel fuel) reacts with oxygen molecule and hydrocarbon peroxyl radical is generated. The hydrocarbon peroxyl radical is decomposed into aldehyde and hydrocarbon radical (refer to (2) in FIG. 7). The hydrocarbon radical reacts with an oxygen molecule and another hydrocarbon peroxyl radical is generated (refer to (3) in FIG. 7). The hydrocarbon peroxyl radical is decomposed into aldehyde and hydrocarbon radical (refer to (4) in FIG. 7). The hydrocarbon radical reacts with an oxygen molecule and also another hydrocarbon peroxyl radical is generated (refer to (5) in FIG. 7). In this way, hydrocarbon peroxyl radical is repeatedly generated while reducing the carbon number, and aldehyde is generated each time of the generation of the hydrocarbon peroxyl radical. It should be noted that, in the hot flame reaction, fuel is completely combusted and carbon dioxide and water are generated, but the reaction intermediate is not generated. In other words, the reaction intermediate generated through the cool flame reaction is oxidized into carbon dioxide and water.

The inventors of the present disclosure had further carried out following experiments to confirm the probability of the simulation results shown in FIGS. 5 and 6. In the experiments, the fuel injector 40 sprayed diesel fuel, and the sprayed diesel fuel was brought into collision against a heated plate (not shown). Then, gas components vaporized on the heated plate were analyzed. As a result of the analysis, it was confirmed that acetaldehyde of about 30 ppm was generated when diesel fuel of 2000 ppm was brought into collision with the heated plate. The analysis result indicates that acetaldehyde can be generated through the cool flame reaction.

Figure 8:
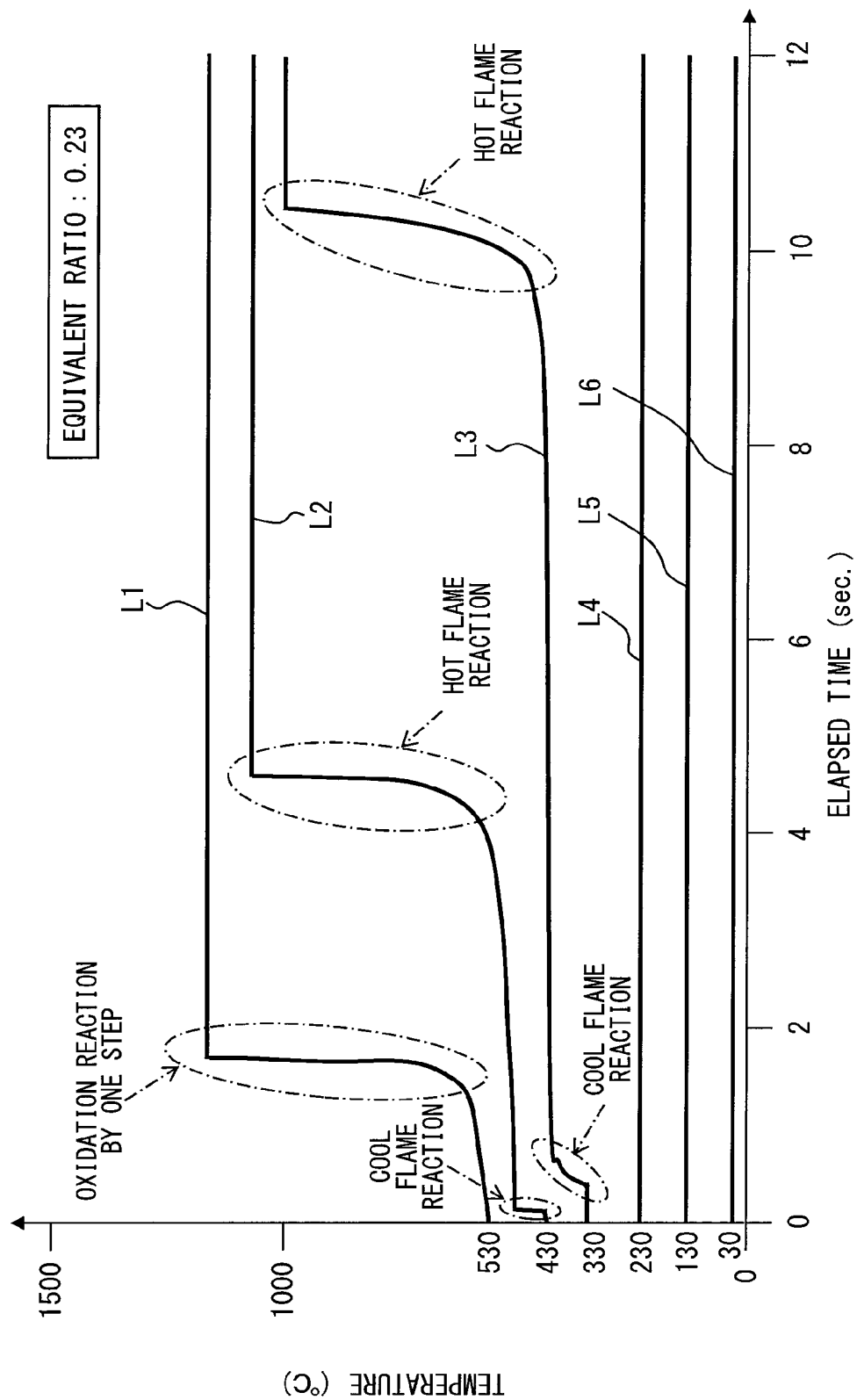
FIG. 8 is a graph illustrating results of simulating temperature changes caused by the two-step oxidation reaction under different conditions of an initial temperature.

In the simulation as shown in FIGS. 5 and 6, a temperature of the heater 50 is set to 430° C. The inventors of the present disclosure further had performed simulation with different temperatures of the heater 50, and analysis results as shown in FIG. 8 were obtained. In FIG. 8, symbols L1, L2, L3, L4, L5, and L6 show results when the heater temperature is set to 530° C., 430° C., 330° C., 230° C., 130° C., and 30° C., respectively.

As indicated by the symbol L1, when the heater temperature is 530° C., there is almost no period to stay in the cool flame reaction, and the oxidation reaction is completed with only one step. On the contrary, when the heater temperature is set to 330° C. as indicated by the symbol L3, a start timing of the cool flame reaction is delayed as compared with a case where the heater temperature is set to 430° C. as indicated by the symbol L2. Also, when the heater temperature is set to 230° C. or lower, as indicated by the symbols L4 to L6, none of the cool flame reaction and the hot flame reaction occurs, i.e., the oxidation reaction does not occur.

Figure 9:
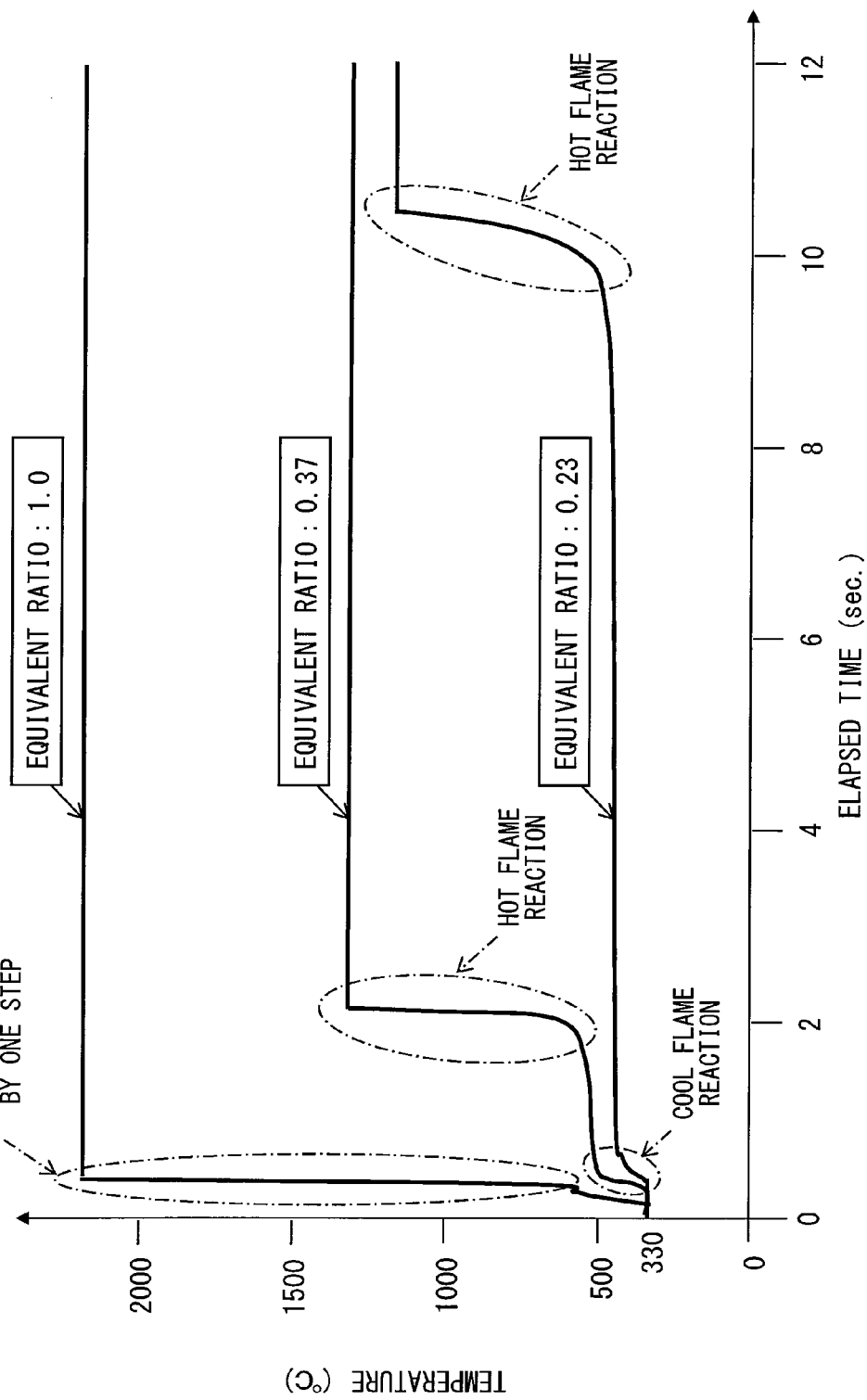
FIG. 9 is a graph illustrating results of simulating temperature changes caused by the two-step oxidation reaction under different conditions of an equivalence ratio.

In the simulation illustrated in FIG. 8, the equivalent ratio, which is a weight ratio of injected fuel to supplied air, is set to 0.23. In this connection, the present inventors have obtained results illustrated in FIG. 9 with the simulation of the different equivalent ratios. It should be noted that the equivalent ratio may be defined as a value by dividing "weight of fuel contained in an air-fuel mixture" by "weight of fuel that can be completely burned". As illustrated in FIG. 9, when the equivalent ratio is set to 1.0, there is almost no period to stay in the cool flame reaction, and the oxidation reaction is completed with only one step. Also, when the equivalent ratio is set to 0.37, the start timing of the cool flame reaction is advanced, a cool flame reaction rate increases, a cool flame reaction period decreases, and the ambient temperature at the time of completing the cool flame reaction increases, as compared with a case in which the equivalent ratio is set to 0.23.

Figure 10:
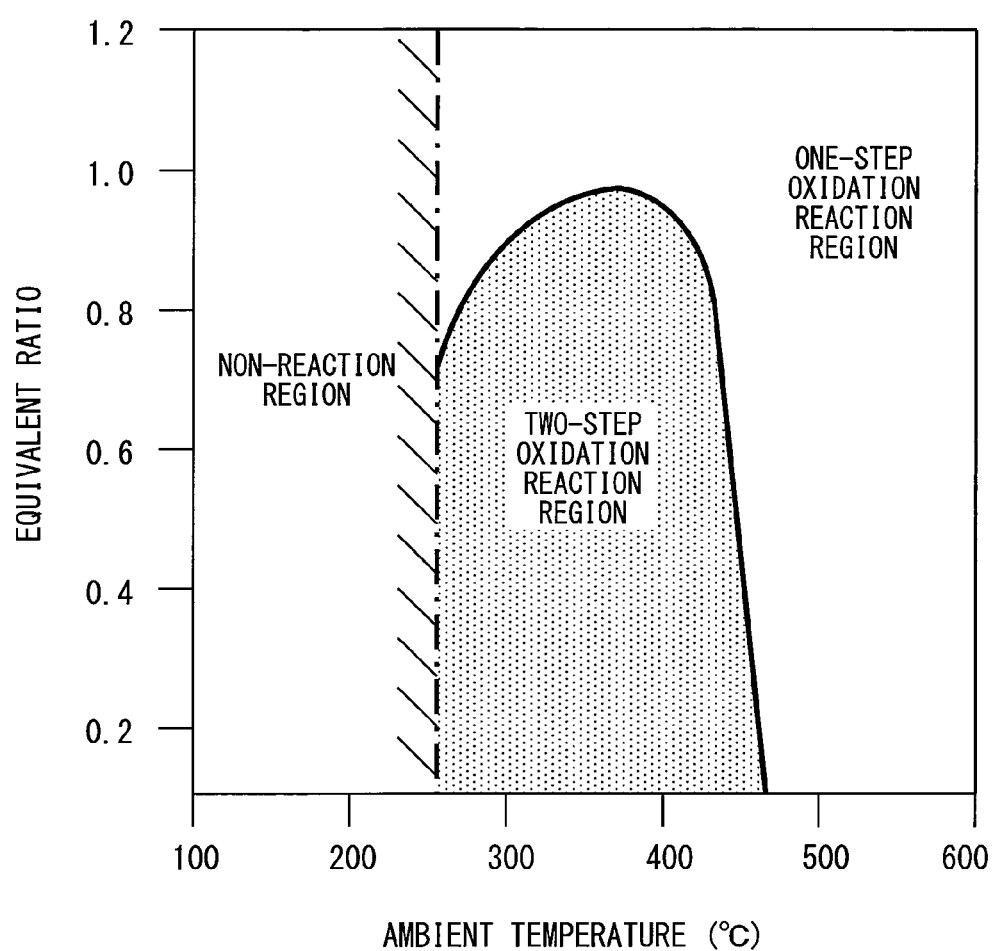
FIG. 10 is a graph illustrating a region of the initial temperature and the equivalent ratio in which the two-step oxidation reaction occurs.

FIG. 10 illustrates a summary of the analysis results of FIGS. 8 and 9, and the abscissa of the graph indicates the heater temperature (the ambient temperature) of FIG. 8 and the ordinate of the graph indicates the equivalent ratio of FIG. 9. The doted region in FIG. 10 is a region in which a two-step oxidation reaction occurs. As shown in FIG. 10, a region in which the ambient temperature is lower than a lower limit value is a non-reaction region in which the oxidation reaction does not occur. Further, even when the ambient temperature is higher than the lower limit value, a region in which the equivalent ratio is equal to or greater than 1.0 is a one-step oxidation reaction region in which the oxidation is completed with only one step.

A boundary line between the two-step oxidation reaction region and the one-step oxidation reaction region is changed according to the ambient temperature and the equivalent ratio. That is, when the ambient temperature falls within a specified temperature range and the equivalent ratio falls within a specified equivalent ratio range, the two-step oxidation reaction occurs. That is, the specified temperature range and the specified equivalent ratio range correspond to the doted region in FIG. 10. When the ambient temperature is set to an optimum temperature (e.g., 370° C.) within the specified temperature range, the equivalent ratio on the boundary line has a maximum value (e.g., 1.0). Thus, in order to generate the cool flame reaction earlier, the heater temperature is adjusted to the optimum temperature and the equivalent ratio is set to 1.0. However, when the equivalent ratio is greater than 1.0, the cool flame reaction does not occur, and thus the equivalent ratio is preferably set to a value less than 1.0 by a given margin.

Figure 11:
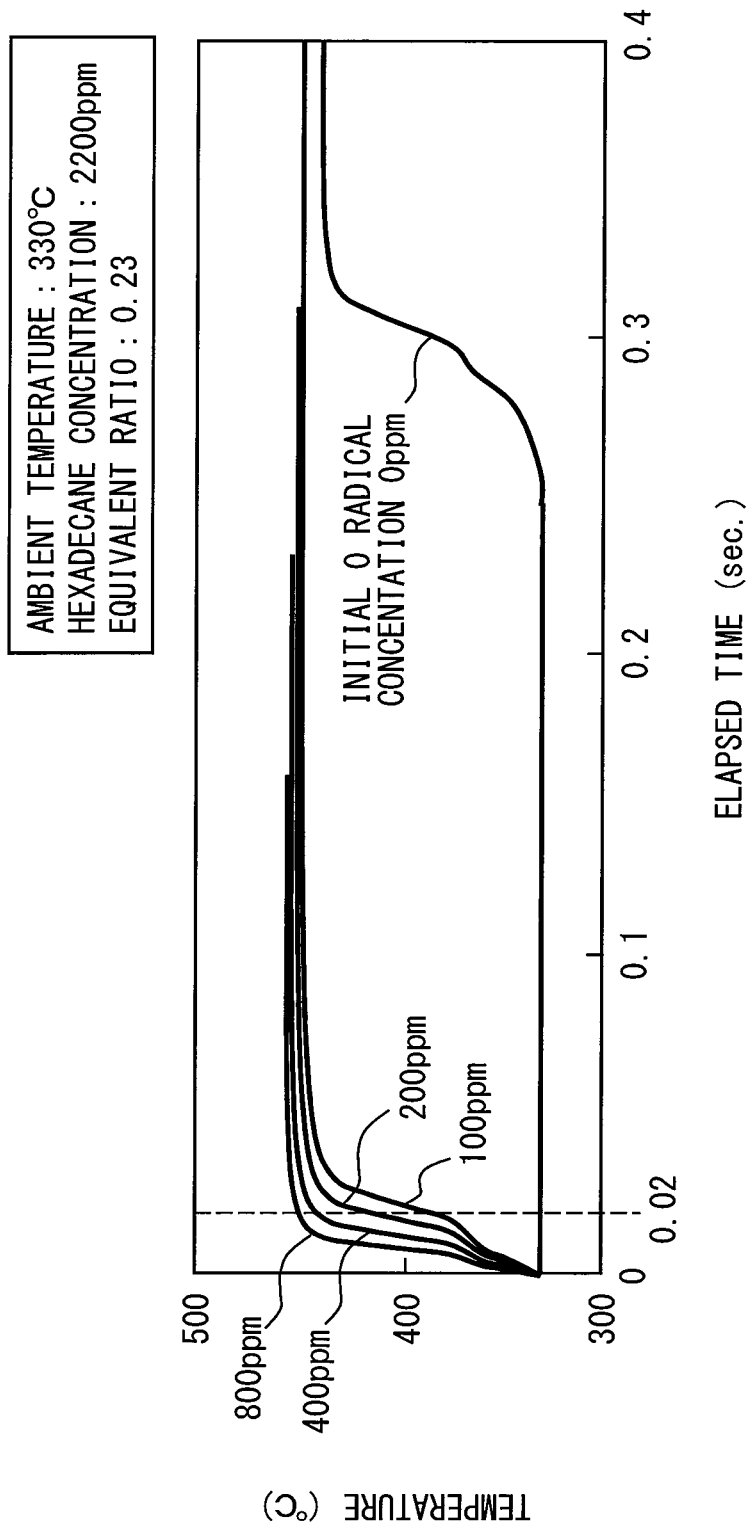
FIG. 11 is a graph illustrating results of simulating temperature changes caused by the two-step oxidation reaction under different conditions of an ozone concentration.

In the simulation as shown in FIGS. 8 and 9, an ozone concentration in air is set to zero. The inventors of the present disclosure had further performed simulation with different ozone concentrations in air, and an analysis result as shown in FIG. 11 was obtained. In the simulation, an initial condition was set with 1 atmospheric pressure, a hexadecane concentration of 2200 ppm, and the ambient temperature of 330° C. As shown in FIG. 11, the start timing of the cool flame reaction becomes earlier as the ozone concentration increases. Such a phenomenon can be explained as below. As described above, hydrocarbon radical reacts with oxygen molecule in (1), (3) and (5) in FIG. 7, and these reaction are accelerated with ozone contained in air. As a result, aldehyde is generated in a short time, whereby the start timing of the cool flame reaction becomes early.

The microcomputer 81 of the ECU 80 includes a memory unit to store programs, and a central processing unit executing an arithmetic processing according to the programs stored in the memory unit. The ECU 80 controls the operation of the internal combustion engine 10 based on detection values of sensors. The sensors may include an accelerator pedal sensor 91, an engine speed sensor 92, a throttle opening sensor 93, an intake air pressure sensor 94, an intake amount sensor 95, an exhaust temperature sensor 96, or the like.

The accelerator pedal sensor 91 detects a depressing amount of an accelerator pedal of a vehicle by a driver. The engine speed sensor 92 detects a rotational speed of an output shaft 10a of the internal combustion engine 10 (i.e., an engine rotational speed). The throttle opening sensor 93 detects an opening amount of the throttle valve 13. The intake air pressure sensor 94 detects a pressure of the intake passage 10in at a position downstream of the throttle valve 13. The intake amount sensor 95 detects the mass flow rate of intake air.

Figure 12:
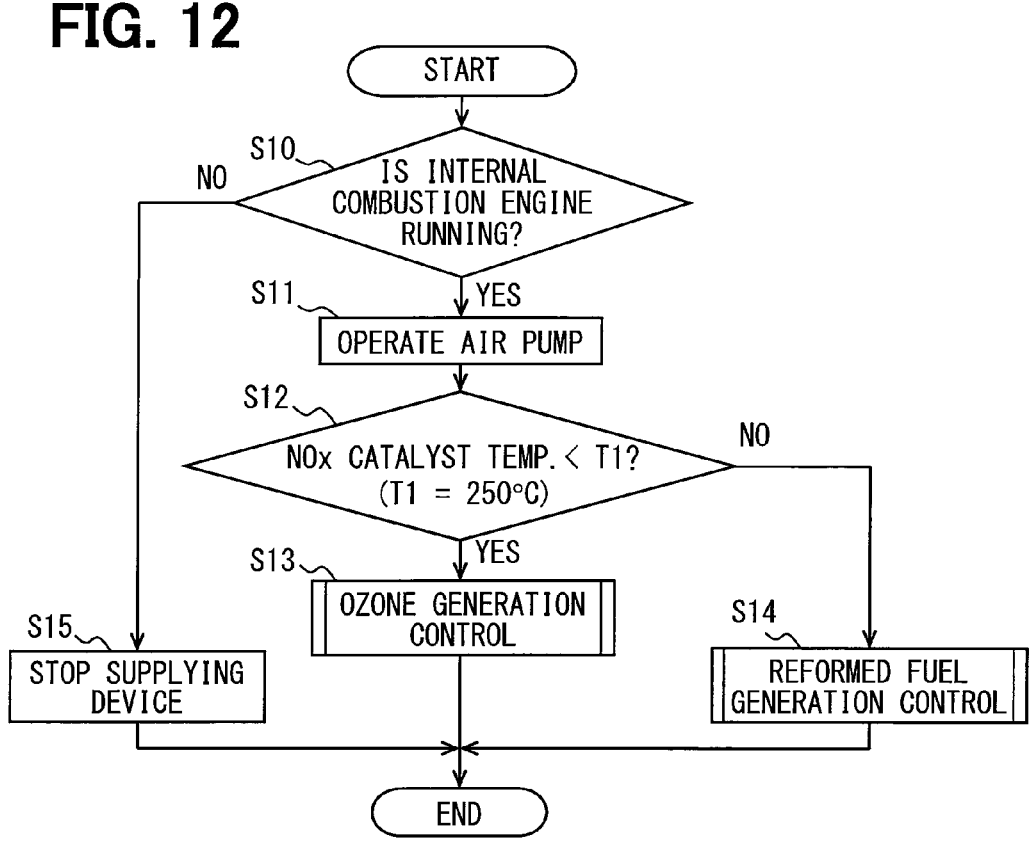
FIG. 12 is a flowchart illustrating a process to switch between generation of ozone and generation of reformed fuel according to the reducing agent supplying device illustrated in FIG. 1.

The ECU 80 generally controls an amount and injection timing of fuel for combustion that is injected from a fuel injection valve (not shown) according to a rotational speed of the output shaft 10a and an engine load of the internal combustion engine 10. Further, the ECU 80 controls the operation of the reducing agent supplying device based on an exhaust temperature detected by the exhaust temperature sensor 96. In other words, the microcomputer 81 switches between the generation of the reformed fuel and the generation of the ozone by repeatedly executing a process (i.e., a program) as shown in FIG. 12 at a predetermined period. The process starts when an ignition switch is turned on and is constantly executed while the internal combustion engine 10 is running.

At Step 10 of FIG. 12, the microcomputer 81 determines whether the internal combustion engine 10 is running. When the internal combustion engine 10 is not running, the operation of the reducing agent supplying device is stopped at Step 15. More specifically, when electric power is supplied to the discharging reactor 20, the air pump 20p, the fuel injector 40 and the heater 50, the electric power supply is stopped. Whereas, when the internal combustion engine 10 is running, the reducing agent supplying device is operated according to a temperature of the reducing catalyst (NOx catalyst temperature) inside the NOx purifying device 15.

More specifically, at Step 11, the air pump 20p is operated with a predetermined power amount. Next, at Step 12, it is determined whether the NOx catalyst temperature is lower than an activation temperature T1 of the reducing catalyst (e.g., 250° C.). The NOx catalyst temperature is estimated using an exhaust temperature detected by the exhaust temperature sensor 96. It should be noted that the activation temperature of the reducing catalyst is a temperature at which reformed fuel can purify NOx through the reduction process.

Figure 13:
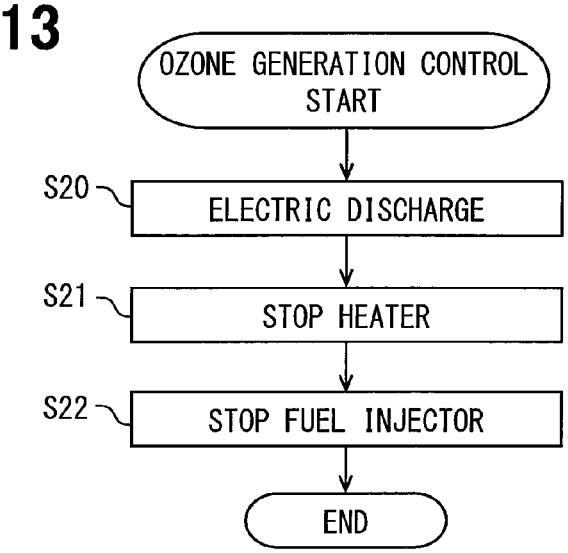
FIG. 13 is a flowchart illustrating a process of a subroutine of an ozone generation control illustrated in FIG. 12.

When it is determined that the NOx catalyst temperature is lower than the activation temperature T1, a subroutine process for an ozone generation control as shown in FIG. 13 is executed at Step 13. Initially, a predetermined power amount is supplied to the electrodes 21 of the discharging reactor 20 to start electrically discharging at Step 20 in FIG. 13. Next, electric power supply to the heater 50 is stopped at Step 21, and electric supply to the fuel injector 40 is stopped to stop fuel injection at Step 22.

According to the ozone generation control, the discharging reactor 20 generates ozone and the generated ozone is supplied into the exhaust passage 10ex through the fuel injection chamber 30a, the vaporizing chamber 30b and the supply passage 32. In this case, if power supply to the heater 50 is implemented, the ozone would be heated by the heater 50 and collapse. Also, if fuel is supplied, the ozone inside the discharging reactor 20 would react with the supplied fuel. In view of this, in the ozone generation control as shown in FIG. 13, heating by the heater 50 and the fuel supply by the fuel injector 40 are stopped. For that reason, since the reaction of the ozone with the fuel and the heating collapse can be avoided, the generated ozone is supplied into the exhaust passage 10ex as it is.

Figure 14:
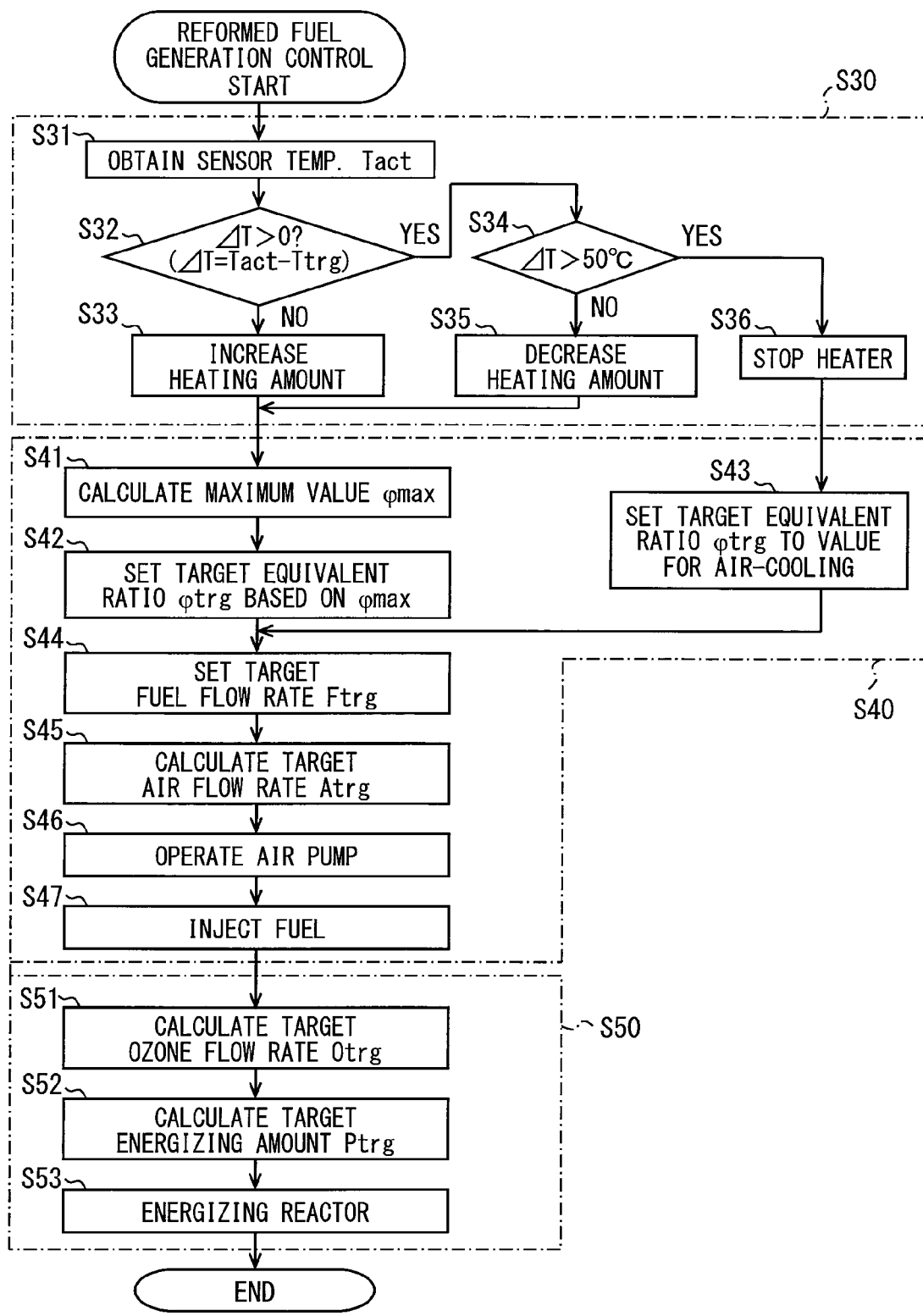
FIG. 14 is a flowchart illustrating a process of a subroutine of a reformed fuel generation control illustrated in FIG. 12.

When it is determined that the NOx catalyst temperature is equal to or higher than the activation temperature T1 in FIG. 12, a subroutine process of reformed fuel generation control illustrated in FIG. 14 is executed at Step 14.

An outline of the process in FIG. 14 will be described according to dashed lines in the figure. In Step 30, the operation of the heater 50 is controlled to adjust a temperature inside the reaction container 30 within the specified temperature range. Then, in Step 40, the equivalent ratio that is a ratio of fuel to air inside the reaction container 30 is adjusted to a value within the specified equivalent ratio range. The specified temperature range and the specified equivalent ratio range are included inside the two-step oxidation region as indicated by the doted region in FIG. 10. Accordingly, the cool flame reaction occurs and the reformed fuel as described above is generated.

The lower limit of the specified temperature range is set to 260° C. that is the boundary line between the one-step oxidation region and the non-reaction region and between the two-step oxidation region and the non-reaction region. The upper limit of the specified temperature range is set to the maximum temperature in a boundary line between the one-step oxidation region and the two-step oxidation region. The upper limit of the specified equivalent ratio range is set to a value that is a maximum value in the boundary line between the one-step oxidation region and the two-step oxidation region and that corresponds to 370° C.

Further, in Step 50, the power supply to the discharging reactor 20 is controlled according to a concentration of fuel within the reaction container 30. Accordingly, ozone is generated, and the generated ozone is supplied into the reaction container 30. Thus, as described above with reference to FIG. 11, the start timing of the cool flame reaction is advanced, and the cool flame reaction time is reduced. Hence, even when the reaction container 30 is downsized so that a staying time of fuel within the reaction container 30 is decreased, the cool flame reaction can be completed within the staying time, whereby the reaction container 30 can be downsized.

The microcomputer 81 executing Step 30 may provide "temperature controller (controller)". The microcomputer 81 executing Step 40 may provide "equivalent ratio controller (controller)". The microcomputer 81 executing Step 50 may provide "discharging power controller (controller)". Hereinafter, the details of those steps S30, S40, and S50 will be described with reference to FIG. 14.

First, the process of the temperature controller at Step 30 will be described. At Step 31, a temperature inside the reducing agent supplying device, i.e., inside the reaction container 30, is obtained. Specifically, a detection temperature Tact detected by the temperature sensor 31 is obtained. At subsequent Step 32, it is determined whether the detection temperature Tact is higher than a predetermined target temperature Ttrg. More specifically, it is determined whether a difference $\Delta t$ obtained by subtracting the target temperature Ttrg from the detection temperature Tact is greater than zero.

When $\Delta T>0$ is not satisfied, the process proceeds to Step 33, and a heating amount by the heater 50 is increased. Specifically, an energizing duty ratio to the heater 50 is increased as the absolute value of the difference $\Delta t$ increases. Whereas, when $\Delta T>0$ is satisfied, it is determined whether the difference $\Delta T$ exceeds a maximum value (e.g., 50° C.) at Step 34. When the difference $\Delta T$ does not exceed the maximum value, the process proceeds to Step 35, and a heating amount by the heater 50 is decreased. Specifically, the energizing duty ratio to the heater 50 is decreased as the absolute value of the difference $\Delta t$ increases. However, when the difference $\Delta T$ exceeds the maximum value, the process proceeds to Step 36, and the electric supply to the heater 50 is stopped. Therefore, the ambient temperature can be rapidly decreased.

The target temperature Ttrg used at Step 32 is set to the ambient temperature (e.g., 370° C.) at which the equivalent ratio has the maximum value in the two-step oxidation region shown in FIG. 10. Since a temperature inside the vaporizing chamber 30b is increased by the cool flame reaction, the heater 50 is controlled to have a temperature that is lower than the target temperature Ttrg by a temperature increase by the cool flame reaction.

Next, a process by the equivalent ratio controller at Step 40 will be described below. At Step 40, when the difference $\Delta t$ is equal to or less than 50° C., the process proceeds to Step 41, and a maximum value $\phi$ max of the equivalent ratio, which corresponds to the detection temperature Tact, and at which the cool flame reaction occurs, is calculated. More specifically, the maximum value $\phi$ max of the equivalent ratio corresponding to the ambient temperature in the two-step oxidation region, or a value obtained by subtracting a given margin from the maximum value $\phi$ max is stored in the microcomputer 81 as a target equivalent ratio $\phi$ trg. For example, a map for the maximum value $\phi$ max of the equivalent ratio corresponding to the ambient temperature in the two-step oxidation region is prepared and the map is stored in the microcomputer 81 in advance. Then, the maximum value $\phi$ max of the equivalent ratio corresponding to the detection temperature Tact is calculated using the map.

At Step 42, the target equivalent ratio $\phi$ trg is set based on the maximum value $\phi$ max of the equivalent ratio calculated at Step 41. More specifically, the target equivalent ratio $\phi$ trg is set by subtracting a given margin from the maximum value $\phi$ max. Accordingly, even when an actual equivalent ratio is greater than the target equivalent ratio $\phi$ trg, the actual equivalent ratio would less likely exceed the maximum value $\phi$ max, and thus the likelihood of nonoccurrence of the cool flame reaction can be decreased.

Whereas, when the difference $\Delta t$ is greater than 50° C. and the heater 50 is stopped at Step 36, the process proceeds to Step 43, and the target equivalent ratio $\phi$ trg is set to a predetermined value for air-cooling. The predetermined value for air-cooling is set to be greater than the maximum value $\phi$ max of the equivalent ratio corresponding to the target temperature Ttrg. In other words, a decrease in the ambient temperature can be accelerated by increasing a flow amount of air compared to the case of Step 42.

At Step 44, a target fuel flow rate Ftrg that is a flow rate of fuel to appropriately supply a necessary fuel amount in order to fully reduce NOx that flows into the NOx purifying device 15 is set. The target fuel flow rate Ftrg means the mass of fuel that is supplied into the NOx purifying device 15 per unit time.

Specifically, the target fuel flow rate Ftrg is set based on an NOx inflow rate that will be described below, and the NOx catalyst temperature. The NOx inflow rate is the mass of NOx that flows into the NOx purifying device 15 per unit time. For example, the NOx inflow rate can be estimated based on an operating condition of the internal combustion engine 10. The NOx catalyst temperature is a temperature of the reducing catalyst inside the NOx purifying device 15. For example, the NOx catalyst temperature can be estimated based on a temperature detected by the exhaust temperature sensor 96.

The target fuel flow rate Ftrg increases as the NOx inflow rate increases. Also, since a reduced amount (reducing performance) of NOx in the presence of the reducing catalyst changes according to the NOx catalyst temperature, the target fuel flow rate Ftrg is set according to a difference in the reducing performance due to the NOx catalyst temperature.

At subsequent Step 45, a target air flow rate Atrg is calculated based on the target equivalent ratio $\phi$ trg set at Step 42 or Step 43, and the target fuel flow rate Ftrg set at Step 44. Specifically, the target air flow rate Atrg is so calculated as to meet $\phi$ trg=Ftrg/Atrg.

In subsequent Step 46, the operation of the air pump 20p is controlled based on the target air flow rate Atrg calculated at Step 45. Specifically, the energizing duty ratio to the air pump 20p increases as the target air flow rate Atrg increases. Next, at Step 47, the operation of the fuel injector 40 is controlled to execute fuel injection based on the target fuel flow rate Ftrg set at Step 44. Specifically, the opening time of the fuel injector 40 is increased as the target fuel flow rate Ftrg increases.

The microcomputer 81 executing Steps 44 and 47 may provide "fuel flow rate controller" that controls a flow rate of fuel that is to be supplied into the vaporizing chamber 30b. The microcomputer 81 executing Steps 41, 42, 43, 45 and 46 may provide "air flow rate controller" that controls a flow rate of air that is to be supplied into the vaporizing chamber 30b.

Then, a description will be given of the process of Step 50 by the discharging power controller. Initially, a target ozone flow rate Otrg is calculated at Step 51 based on the target fuel flow rate Ftrg set at Step 44. Specifically, the target ozone flow rate Otrg is calculated so that a ratio of an ozone concentration to a fuel concentration inside the vaporizing chamber 30b becomes a given value (for example, 0.2). For example, the ratio is set so that the cool flame reaction can be completed within a given time (for example, 0.02 sec). For example, when the fuel concentration is 2200 ppm as shown in FIG. 11, the ozone concentration of 400 ppm is required to complete the cool flame reaction within 0.02 sec. In this case, the target ozone flow rate Otrg is set such that the ozone concentration becomes 400 ppm.

In subsequent Step 52, a target energizing amount Ptrg to the discharging reactor 20 is calculated based on the target air flow rate Atrg calculated at Step 45 and the target ozone flow rate Otrg calculated at Step S51. The staying time of air inside the discharging passage 21a is decreases as the target air flow rate Atrg increases. Therefore, the target energizing amount Ptrg is increased as the target air flow rate Atrg increases.

According to the present embodiment, the reducing agent supplying device includes the reaction container 30 in which fuel is oxidized with oxygen in air. A temperature and the equivalent ratio within the reaction container 30 are adjusted to generate the cool flame reaction, and fuel (reformed fuel) partially oxidized through the cool flame reaction is supplied into the exhaust passage 10ex as the NOx purifying reducing agent. Thus, the NOx purification rate can be improved as compared with a case in which fuel not partially oxidized is used as the reducing agent.

Further, in the present embodiment, the discharging reactor 20 is provided, and ozone generated by the discharging reactor 20 is supplied into the reaction container 30 when the cool flame reaction is generated. For that reason, the start timing of the cool flame reaction can be advanced, and the cool flame reaction time can be reduced. Hence, even when the reaction container 30 is downsized, and a staying time of the fuel within the reaction container 30 is shortened, the cool flame reaction can be completed within the staying time. Thus, the reaction container 30 can be downsized.

Further in the present embodiment, the electric power used for the electric discharge is controlled according to the concentration of fuel inside the vaporizing chamber 30b through the process of Step 50 in FIG. 14. For example, the target ozone flow rate Otrg is calculated so that a ratio of the ozone concentration to the fuel concentration becomes a given value (for example, 0.2), and then a discharging power is controlled. For that reason, the excess or deficiency of the ozone concentration with respect to the fuel concentration is suppressed, and the start of the cool flame reaction can be advanced by supplying the ozone at the appropriate amount, whereby the electric consumption at the discharging reactor 20 can be reduced.

Further in the present embodiment, when a temperature of the reducing catalyst is lower than the activation temperature T1, ozone generated by the discharging reactor 20 is supplied into the vaporizing chamber 30b while stopping fuel injection by the fuel injector 40, thereby supplying ozone into the exhaust passage 10ex. Accordingly, the reformed fuel as the reducing agent can be prevented from being supplied when the reducing catalyst in the NOx purifying device 15 is not activated. Since NO in the exhaust gas is oxidized into $NO_2$ by supplying ozone, and is adsorbed inside the NOx purification catalyst, an NOx adsorption amount inside the NOx purifying device 15 can increase.

Further in the present embodiment, the heater 50 that heats the fuel, and the temperature sensor 31 that detects a temperature (ambient temperature) inside the vaporizing chamber 30b are provided. The temperature controller at Step 30 of FIG. 14 controls the operation of the heater 50 according to a temperature detected by the temperature sensor 31 to adjust temperature inside the vaporizing chamber 30b to the specified temperature range. Accordingly, a temperature inside the vaporizing chamber 30b is detected directly by the temperature sensor 31. Also, fuel in the vaporizing chamber 30b is heated directly by the heater 50. For that reason, it can be realized with high precision to adjust a temperature inside the vaporizing chamber 30b to the specified temperature range.

It should be noted that the specified equivalent ratio range where the cool flame reaction occurs may be different depending on the ambient temperature as shown in FIG. 10. Taking the above fact into consideration, the equivalent ratio controller at Step 40 of FIG. 14 changes the target equivalent ratio $\phi$ trg according to the detection temperature Tact. Hence, even when the detection temperature Tact is shifted from the target temperature Ttrg, since the equivalent ratio is adjusted according to the actual temperature inside the vaporizing chamber 30b, the cool flame reaction can surely occur.

Further, in the present embodiment, the target fuel flow rate Ftrg is set at Steps 44 and 47 (fuel injection amount controller) of FIG. 14 based on a required flow rate of the reducing agent that is required by the NOx purifying device 15. The target air flow rate Atrg is set at Steps 41, 42, 43, 45 and 46 (air flow rate controller) based on the target fuel flow rate Ftrg so that the equivalent ratio falls within the specified equivalent ratio range. For that reason, the equivalent ratio can be adjusted to the specified equivalent ratio range while satisfying the required flow rate of the reducing agent required by the NOx purifying device 15.

Further, according to the present embodiment, the cracking is generated by the heater 50 to thermally decompose fuel into a hydrocarbon compound having a small carbon number. Since the hydrocarbon compound having a small carbon number has a low boiling point, vaporized fuel can be suppressed to return to liquid form.

Second Embodiment

In the first embodiment illustrated in FIG. 1, air is supplied into the discharging reactor 20 by the air pump 20p. On the contrary, in a reducing agent supplying device according to the second embodiment illustrated in FIG. 15, a portion of intake air in the internal combustion engine 10 is supplied into the discharging reactor 20.

Specifically, a branch pipe 36h connects between a portion of the intake passage 10in downstream of the compressor 11c and upstream of the cooler 12, and the fluid passage 22a of the discharging reactor 20. Also, a branch pipe 36c connects between a portion of the intake passage 10in downstream of the cooler 12, and the fluid passage 22a. A high temperature intake air without being cooled by the cooler 12 is supplied into the discharging reactor 20 through the branch pipe 36h. Whereas, a low temperature intake air after being cooled by the cooler 12 is supplied into the discharging reactor 20 through the branch pipe 36c.

An electromagnetic valve 36 that opens and closes an internal passage of the respective branch pipes 36h and 36c is attached to the branch pipes 36h and 36c. The operation of the electromagnetic valve 36 is controlled by the microcomputer 81. When the electromagnetic valve 36 operates to open the branch pipe 36h and close the branch pipe 36c, the high temperature intake air flows into the discharging reactor 20. When the electromagnetic valve 36 operates to open the branch pipe 36c and close the branch pipe 36h, the low temperature intake air flows into the discharging reactor 20.

The operation of the electromagnetic valve 36 allows switching between a mode in which the high temperature intake air without being cooled by the cooler 12 branches off from an upstream of the cooler 12, and a mode in which the low temperature intake air after being cooled by the cooler 12 branches off from a downstream of the cooler 12. In this case, the mode for supplying the low temperature intake air is selected during the ozone generation control, and thus the generated ozone is prohibited from being destroyed by heat of the intake air. Whereas, the mode for supplying the high temperature intake air is selected during other than the ozone generation control, and fuel heated by the heater 50 is prohibited from being cooled by the intake air within the reaction chamber.

During a period for which the electromagnetic valve 36 is opened, an amount of intake air into the combustion chambers of the internal combustion engine 10 is reduced by an amount of portions of the intake air that flow through the branch pipes 36h and 36c. For that reason, the microcomputer 81 corrects the opening of the throttle valve 13 or a compressing amount by the compressor 11c so that an amount of intake air flowing into the combustion chambers increases by the amount of the intake air flowing through the branch pipes 36h and 36c during the opening period of the electromagnetic valve 36.

According to the present embodiment, a portion of intake air compressed by the compressor 11c is supplied into the discharging reactor 20. For that reason, air containing oxygen can be supplied into the discharging reactor 20 without the air pump 20p as illustrated in FIG. 1.

Third Embodiment

Figure 16:
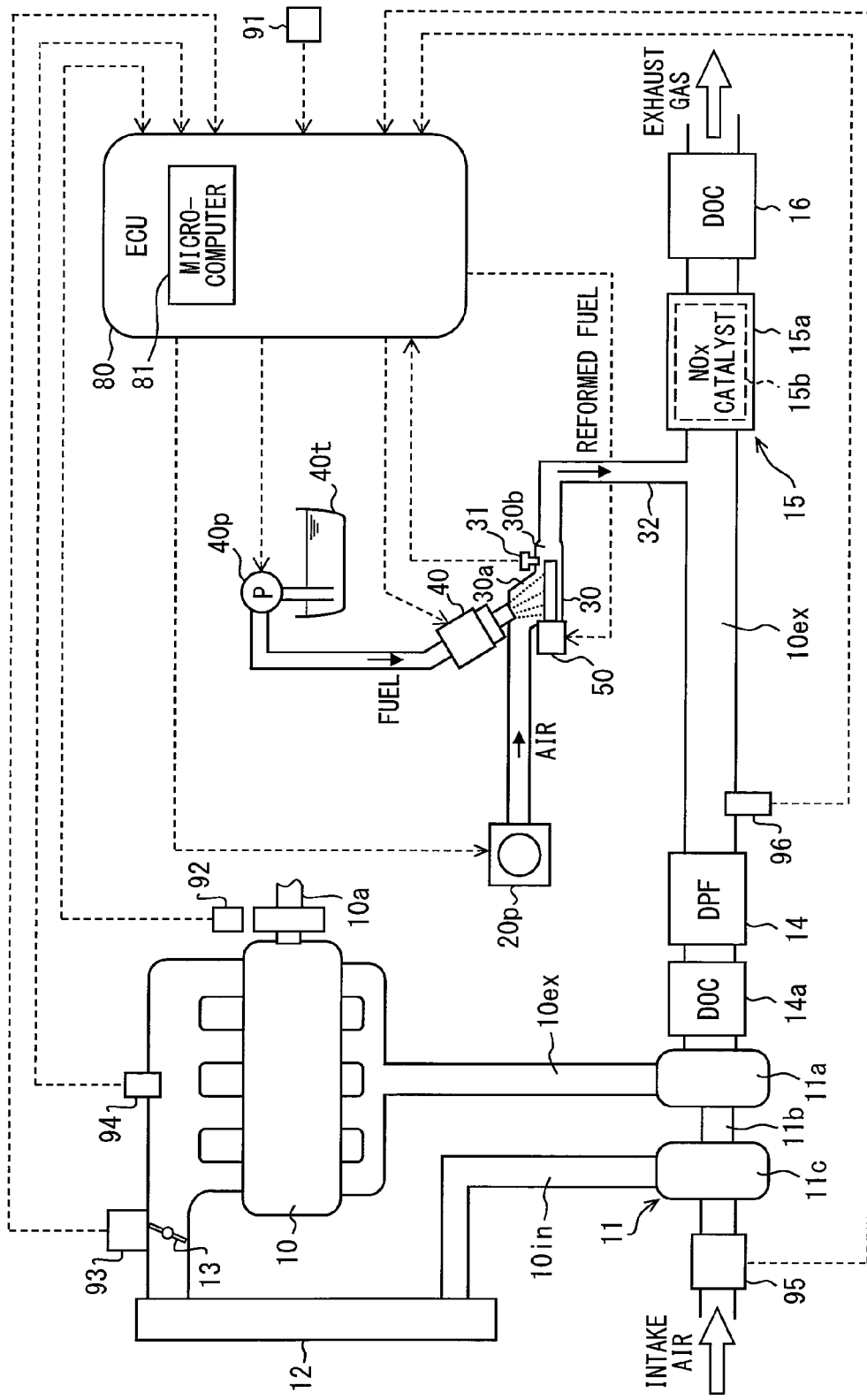
FIG. 16 is a schematic view of a reducing agent supplying device applied to a combustion system.

In the embodiments as illustrated in FIGS. 1 and 5, ozone is generated by the discharging reactor 20 and the generated ozone is supplied into the reaction container 30. Alternatively, in the third embodiment as shown in FIG. 16, the discharging reactor 20 is eliminated. In this case, although an acceleration of the reaction rate by ozone in the reaction container 30 cannot be obtained, the downsizing of the reducing agent supplying device can be realized.

Other Embodiments

The preferred embodiments of the present invention have been described above. However, the present invention is not limited to the embodiments described above, but can be implemented with various modifications as exemplified below.

In the embodiment illustrated in FIG. 1, the heater 50 is arranged within the reaction container 30. Alternatively, the heater 50 may be arranged outside of the reaction container 30 so that fuel or air is heated at a position upstream of the reaction container 30. Also, in the embodiment illustrated in FIG. 1, the temperature sensor 31 is arranged within the reaction container 30. Alternatively, the temperature sensor 31 may be arranged at a position downstream of the reaction container 30.

In the above-described embodiment as shown in FIG. 1, the fuel injector 40 is used as the atomizer that atomizes liquid fuel and supplies the atomized liquid fuel to the heater. A vibrating device that atomizes fuel in liquid form by vibrating the fuel may be used as the atomizer. The vibrating device may have a vibrating plate that vibrates at a high frequency and fuel is vibrated on the vibrating plate.

Figure 15:
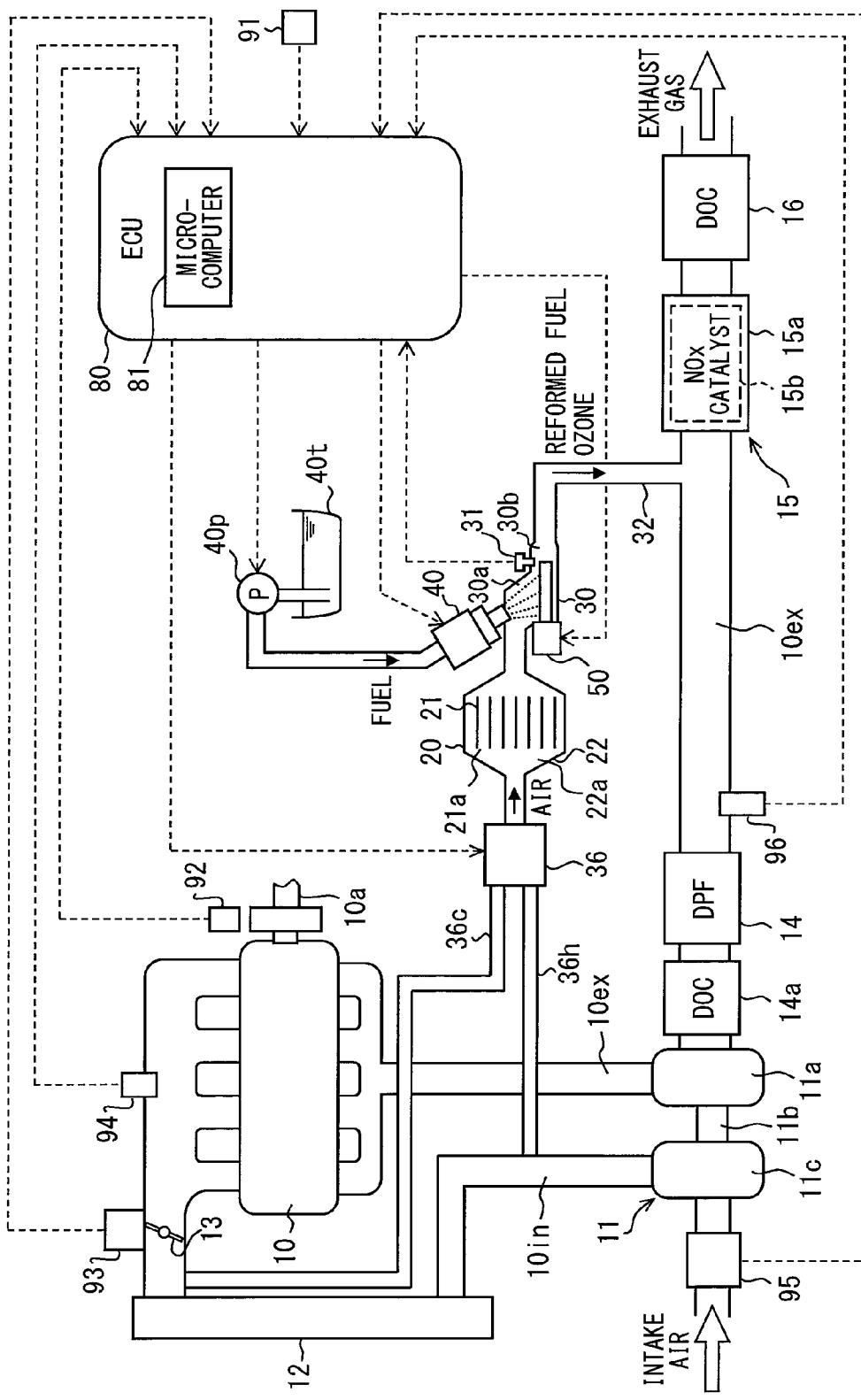
FIG. 15 is a schematic view of a reducing agent supplying device applied to a combustion system.

In the above-described embodiment illustrated in FIG. 15, intake air branches off from two portions of the intake passage 10in upstream and downstream of the cooler 12 through the branch pipes 36h and 36c. On the contrary, any one of the two branch pipes 36h and 36c may be eliminated, and the switching of the modes by the electromagnetic valve 36 may be also eliminated.

When the reducing agent supplying device is in a complete stop state in which generation of both the ozone and the reformed reducing agent is stopped, the electric discharge at the discharging reactor 20 may be stopped to reduce wasteful electric consumption. The reducing agent supplying device may be in the complete stop state when, for example, the NOx catalyst temperature is lower than the activation temperature and the NOx adsorbed amount reaches the saturation amount, or when the NOx catalyst temperature becomes high beyond a max temperature at which the reducing catalyst can reduce NOx. Further, the operation of the air pump 20p may be stopped in the complete stop state so as to reduce wasteful power consumption.

In the above-described embodiment as shown in FIG. 1, the reducing catalyst that physically adsorbs NOx (i.e., physisorption) is used in the NOx purifying device 15, but a reducing agent that chemically adsorbs NOx (i.e., chemisorption) may be used.

The NOx purifying device 15 may adsorb NOx when an air-fuel ratio in the internal combustion engine 10 is leaner than a stoichiometric air-fuel ratio (i.e., when the engine 10 is in lean combustion) and may reduce NOx when the air-fuel ratio in the internal combustion engine 10 is not leaner than the stoichiometric air-fuel ratio (i.e., when the engine 10 is in non-lean combustion). In this case, ozone is generated at the lean combustion and the reformed reducing agent is generated at the non-lean combustion. One of examples of a catalyst that adsorbs NOx at the lean combustion may be a chemisorption reducing catalyst made of platinum and barium carried by a carrier.

The reducing agent supplying device may be applied to a combustion system that has the NOx purifying device 15 without adsorption function (i.e., physisorption and chemisorption functions). In this case, in the NOx purifying device 15, an iron-based or copper-based catalyst may be used as the catalyst having the NOx reducing performance in a given specified temperature range in the lean combustion, and a reforming substance may be supplied to those catalysts as the reducing agent.

In the above-described embodiment, the NOx catalyst temperature used at Step 12 of FIG. 12 is estimated based on the exhaust temperature detected by the exhaust temperature sensor 96. However, a temperature sensor may be attached to the NOx purifying device 15, and the temperature sensor may detect directly the NOx catalyst temperature. Or, the NOx catalyst temperature may be estimated based on a rotational speed of the output shaft 10*a* and an engine load of the internal combustion engine 10.

In the above-described embodiment as shown in FIG. 1, the discharging reactor 20 has the electrodes 21, each of which has a plate shape and faces each other in parallel. However, the discharging reactor 20 may have an acicular electrode (pin electrode) protruding in an acicular manner and an annular electrode annularly surrounding the acicular electrode.

In the above-described embodiment as shown in FIG. 1, the reducing agent supplying device is applied to the combustion system that is installed in a vehicle. However, the active substance supplying system may be applied to a stationary combustion system. Further, in the embodiments as shown in FIG. 1, the reducing agent supplying device is applied to a compression self-ignition diesel engine, and diesel for combustion is used as the reducing agent. However, the reducing agent supplying device may be applied to a self-ignition gasoline engine, and gasoline for combustion may also be used for the reducing agent.

Means and functions provided by the ECU may be provided by, for example, only software, only hardware, or a combination thereof. The ECU may be constituted by, for example, an analog circuit.

What is claimed is:

1. A reducing agent supplying device for a fuel combustion system that includes a NOx purifying device with a reducing catalyst arranged in an exhaust passage to purify NOx contained in exhaust gas of an internal combustion engine, the reducing agent supplying device supplying a reducing agent into the exhaust passage at a position upstream of the reducing catalyst, the reducing agent supplying device comprising:
    a reaction container that has a reaction chamber therein in which fuel of a hydrocarbon compound is mixed with air and is oxidized with oxygen in the air;
    a computer, comprising a processor, the computer being configured to:
        perform an equivalent ratio control that adjusts an equivalent ratio of the fuel to air inside the reaction chamber to be within a specified equivalent ratio range;
        perform a temperature control that adjusts a temperature inside the reaction chamber to be within a specified temperature range; and
        change a target equivalent ratio, which is a target value of the equivalent ratio, according to the temperature inside the reaction chamber, wherein
    the specified equivalent ratio range and the specified temperature range are set such that a cool flame reaction, through which the fuel inside the reaction chamber is partially oxidized with oxygen, is generated, and
    the fuel that is partially oxidized through the cool flame reaction is used as the reducing agent.

2. The reducing agent supplying device according to claim 1, further comprising
    an ozone generator that generates ozone, wherein
    the ozone generated by the ozone generator is supplied into the reaction chamber when generating the cool flame reaction.

3. The reducing agent supplying device according to claim 2, wherein
    the ozone generator generates ozone by electrically discharging air, and
    the reducing agent supplying device further comprises a discharging power controller that controls electric power used for an electric discharge at the ozone generator according to a concentration of the fuel inside the reaction chamber.

4. The reducing agent supplying device according to claim 2, wherein
    when a temperature of the reducing catalyst is lower than an activation temperature of the reducing catalyst, the ozone generated by the ozone generator is supplied into the reaction chamber while stopping fuel supply into the reaction chamber to supply the ozone into the exhaust passage at a position upstream of the reducing catalyst.

5. The reducing agent supplying device according to claim 1, further comprising:
    a heater that heats the fuel supplied into the reaction chamber; and
    a temperature sensor that detects a temperature inside the reaction chamber, wherein
    the computer is further configured to adjust the temperature inside the reaction chamber to be within the specified temperature range by controlling the heater according to the temperature detected by the temperature sensor.

6. The reducing agent supplying device according to claim 1, wherein
    the computer is further configured to:
        control a flow rate of the fuel to be supplied into the reaction chamber; and
        control a flow rate of the air to be supplied into the reaction chamber, wherein
        set a target fuel flow rate, which is a target value of the flow rate of fuel to be supplied into the reaction chamber, based on a required flow rate of the reducing agent, which is required at the NOx purifying device, and
        set a target air flow rate, which is a target value of the flow rate of air to be supplied into the reaction chamber, based on the target fuel flow rate such that the equivalent ratio is within the specified equivalent ratio range.

* * * * *